United States Patent
Panagos et al.

(10) Patent No.: US 11,070,603 B2
(45) Date of Patent: Jul. 20, 2021

(54) APPARATUS AND METHODS FOR PACKETIZED CONTENT ROUTING AND DELIVERY

(71) Applicant: Charter Communications Operating, LLC, St. Louis, MO (US)

(72) Inventors: James Panagos, Broomfield, CO (US); Justin Slaughter, Highlands Ranch, CO (US)

(73) Assignee: Charter Communicatons Operating, LLC, St. Louis, MO (US)

( * ) Notice: Subject to any disclaimer, the term of this patent is extended or adjusted under 35 U.S.C. 154(b) by 30 days.

(21) Appl. No.: 16/286,200

(22) Filed: Feb. 26, 2019

(65) Prior Publication Data
US 2019/0268393 A1   Aug. 29, 2019

Related U.S. Application Data

(60) Provisional application No. 62/635,430, filed on Feb. 26, 2018.

(51) Int. Cl.
*H04L 29/06*  (2006.01)
*H04L 29/12*  (2006.01)
*H04L 29/08*  (2006.01)

(52) U.S. Cl.
CPC ........ *H04L 65/4084* (2013.01); *H04L 61/106* (2013.01); *H04L 61/1511* (2013.01); *H04L 65/608* (2013.01); *H04L 67/2842* (2013.01)

(58) Field of Classification Search
CPC ..... H04L 67/2842; H04L 6/02; H04L 61/106; H04L 61/1511; H04L 61/6059;
(Continued)

(56) References Cited

U.S. PATENT DOCUMENTS 6,161,137 A   12/2000   Ogdon et al.
6,810,417 B2  10/2004   Lee
(Continued)

OTHER PUBLICATIONS

Fernanda, et al., : "Anycast as a Load Balancing feature", USENIX, Aug. 27, 2010 (Aug. 27, 2010), pp. 1-4, XP061010498, [retrieved on Aug. 27, 2010].
(Continued)

*Primary Examiner* — Michael C Lai
(74) *Attorney, Agent, or Firm* — Gazdzinski & Associates, PC

(57) ABSTRACT

Apparatus and methods for managing content delivery in a packetized network. In one embodiment, the network provide content to a plurality of clients via a plurality of nodes and origin points, and resources are discreetly represented (e.g., with IP addresses, such as those afforded under the IPv6 protocol) to allows for direct advertisement of resources. Exemplary solutions described herein further advantageously leverage extant architectures and protocols (such as BGP), and make use of a common control plane, which can be utilized for example by different content delivery network (CDN) operators and different delivery components to advertise resources. Internally within a given CDN, increased granularity of resource addressing and advertisement may provide benefits including: (i) resource affinity; (ii) resource-level balancing; (iii) dynamic resource scoping; and (iv) "zero-touch" provisioning and resource relocation.

20 Claims, 26 Drawing Sheets

(58) Field of Classification Search
CPC ............ H04L 65/4084; H04L 65/608; H04L 65/607; H04L 65/80

See application file for complete search history.

(56) References Cited

U.S. PATENT DOCUMENTS

| | | | |
|---|---|---|---|
| 7,154,898 B1 | 12/2006 | Pecus et al. | |
| 8,073,940 B1 | 12/2011 | Richardson et al. | |
| 8,301,776 B2 | 10/2012 | Hebert et al. | |
| 8,386,629 B2 | 2/2013 | Tan et al. | |
| 8,468,271 B1 | 6/2013 | Panwar et al. | |
| 8,954,491 B1 | 2/2015 | Medved et al. | |
| 9,130,970 B2 | 9/2015 | Carney et al. | |
| 9,160,809 B2 | 10/2015 | Carney et al. | |
| 9,235,547 B1 | 1/2016 | Hartman et al. | |
| 9,350,706 B1 | 5/2016 | Smith et al. | |
| 9,467,369 B2* | 10/2016 | Panagos | H04N 21/236 |
| 9,743,142 B2 | 8/2017 | Cholas et al. | |
| 9,743,151 B2* | 8/2017 | Patterson | H04N 21/6405 |
| 9,755,950 B2 | 9/2017 | Butler et al. | |
| 9,847,844 B2 | 12/2017 | Schooling et al. | |
| 10,070,155 B2* | 9/2018 | Panagos | H04N 21/6125 |
| 10,581,721 B2* | 3/2020 | Panagos | H04N 21/2225 |
| 2001/0049740 A1 | 12/2001 | Karpoff | |
| 2002/0059621 A1 | 5/2002 | Thomas et al. | |
| 2002/0116529 A1 | 8/2002 | Hayden | |
| 2002/0142750 A1 | 10/2002 | Gill | |
| 2003/0110509 A1 | 6/2003 | Levinson et al. | |
| 2003/0211839 A1 | 11/2003 | Baum et al. | |
| 2004/0010588 A1 | 1/2004 | Slater et al. | |
| 2004/0017769 A1 | 1/2004 | Denecheau et al. | |
| 2004/0039844 A1 | 2/2004 | Bonn | |
| 2006/0182034 A1 | 8/2006 | Klinker et al. | |
| 2007/0011717 A1 | 1/2007 | Lauder et al. | |
| 2007/0091793 A1 | 4/2007 | Filsfils et al. | |
| 2007/0101379 A1 | 5/2007 | Pereira et al. | |
| 2007/0107010 A1 | 5/2007 | Jolna et al. | |
| 2008/0285945 A1 | 11/2008 | Rajakarunanayake | |
| 2009/0083279 A1 | 3/2009 | Hasek | |
| 2009/0100459 A1 | 4/2009 | Riedl et al. | |
| 2009/0138601 A1 | 5/2009 | Hebert et al. | |
| 2009/0210899 A1 | 8/2009 | Lawrence-Apfelbaum et al. | |
| 2009/0210912 A1 | 8/2009 | Cholas et al. | |
| 2009/0217324 A1 | 8/2009 | Massimi | |
| 2009/0248886 A1 | 10/2009 | Tan et al. | |
| 2009/0260046 A1 | 10/2009 | Yang | |
| 2009/0262741 A1 | 10/2009 | Jungck et al. | |
| 2009/0313330 A1 | 12/2009 | Sakamoto | |
| 2010/0115565 A1 | 5/2010 | Fujihira et al. | |
| 2010/0118758 A1* | 5/2010 | Brandt | H04L 12/189 370/312 |
| 2010/0121969 A1 | 5/2010 | Levitan | |
| 2010/0128918 A1 | 5/2010 | MacWan | |
| 2010/0231790 A1 | 9/2010 | Ansari et al. | |
| 2010/0313223 A1 | 12/2010 | Straub | |
| 2010/0332595 A1 | 12/2010 | Fullagar et al. | |
| 2011/0107364 A1* | 5/2011 | Lajoie | H04L 65/1016 725/25 |
| 2011/0131180 A1 | 6/2011 | Tuli et al. | |
| 2011/0154213 A1 | 6/2011 | Wheatley et al. | |
| 2011/0274112 A1* | 11/2011 | Czaszar | H04L 45/00 370/392 |
| 2012/0008786 A1 | 1/2012 | Cronk et al. | |
| 2012/0023535 A1 | 1/2012 | Brooks | |
| 2012/0110202 A1 | 5/2012 | Niman | |
| 2012/0151012 A1 | 6/2012 | Mustafa | |
| 2013/0018978 A1 | 1/2013 | Crowe et al. | |
| 2013/0121339 A1 | 5/2013 | Dispensa et al. | |
| 2013/0188645 A1 | 7/2013 | Mack-Crane | |
| 2013/0262697 A1 | 10/2013 | Karasaridis et al. | |
| 2013/0268856 A1 | 10/2013 | Hejl, Jr. et al. | |
| 2013/0318195 A1 | 11/2013 | Kwapniewski et al. | |
| 2014/0006158 A1 | 1/2014 | Cooper | |
| 2014/0010161 A1* | 1/2014 | Jeong | H04W 8/18 370/328 |
| 2014/0036663 A1 | 2/2014 | Narayanan | |
| 2015/0040173 A1* | 2/2015 | Panagos | H04N 21/236 725/116 |
| 2015/0043383 A1 | 2/2015 | Farkas et al. | |
| 2015/0063249 A1 | 3/2015 | Jover et al. | |
| 2015/0074187 A1 | 3/2015 | Fletcher et al. | |
| 2015/0381493 A1 | 12/2015 | Bansal et al. | |
| 2017/0026712 A1* | 1/2017 | Gonder | H04L 65/605 |
| 2019/0069037 A1 | 2/2019 | Murphy | |
| 2019/0268393 A1* | 8/2019 | Panagos | H04L 65/80 |

OTHER PUBLICATIONS

Marques, et al., "Advertisement of the best external route in BGP; draft-ietf-idr-best-external-05.txt", Advertisement of the Best External Route in BGP; Draft-IETF-IDR-Best-External-05.Txt, Internet Engineering Task Force, IETF; Standardworkingdraft, Internet Society (ISOC) 4, Rue Des Falaises CH-1205 Geneva, Switzerland, Jan. 3, 2012 (Jan. 3, 2012), pp. 1-21, XP015079961, [retrieved on Jan. 3, 2012].

Mohapatra, et al., "Fast Connectivity Restoration Using BGP Addpath; draft-pmohapat-idr-fast-conn-restore-03. txt", Fast Connectivity Restoration Using BGP Add-Path; Draft-PMOHAPAT-IDR-Fast-Conn-Restore-03.Txt, Internet Engineering Task Force, IETF; Standardworkingdraft, Internet Society (ISOC) 4, Rue Des Falaises CH-1205 Geneva, Switzerland, Jan. 22, 2013 (Jan. 22, 2013), pp. 1-19, XP015089608, [retrieved on Jan. 22, 2013].

Raszuk, et al., "Distribution of Diverse BGP Paths; RFC6774.txt", Distribution of Diverse BGP Paths; RFC6774.Txt, Internet Engineering Task Force, IETF; Standard, Internet Society (ISOC) 4, Rue Des Falaises CH-1205 Geneva, Switzerland, Nov. 6, 2012 (Nov. 6, 2012), pp. 1-22, XP015086470, [retrieved on Nov. 6, 2012].

* cited by examiner

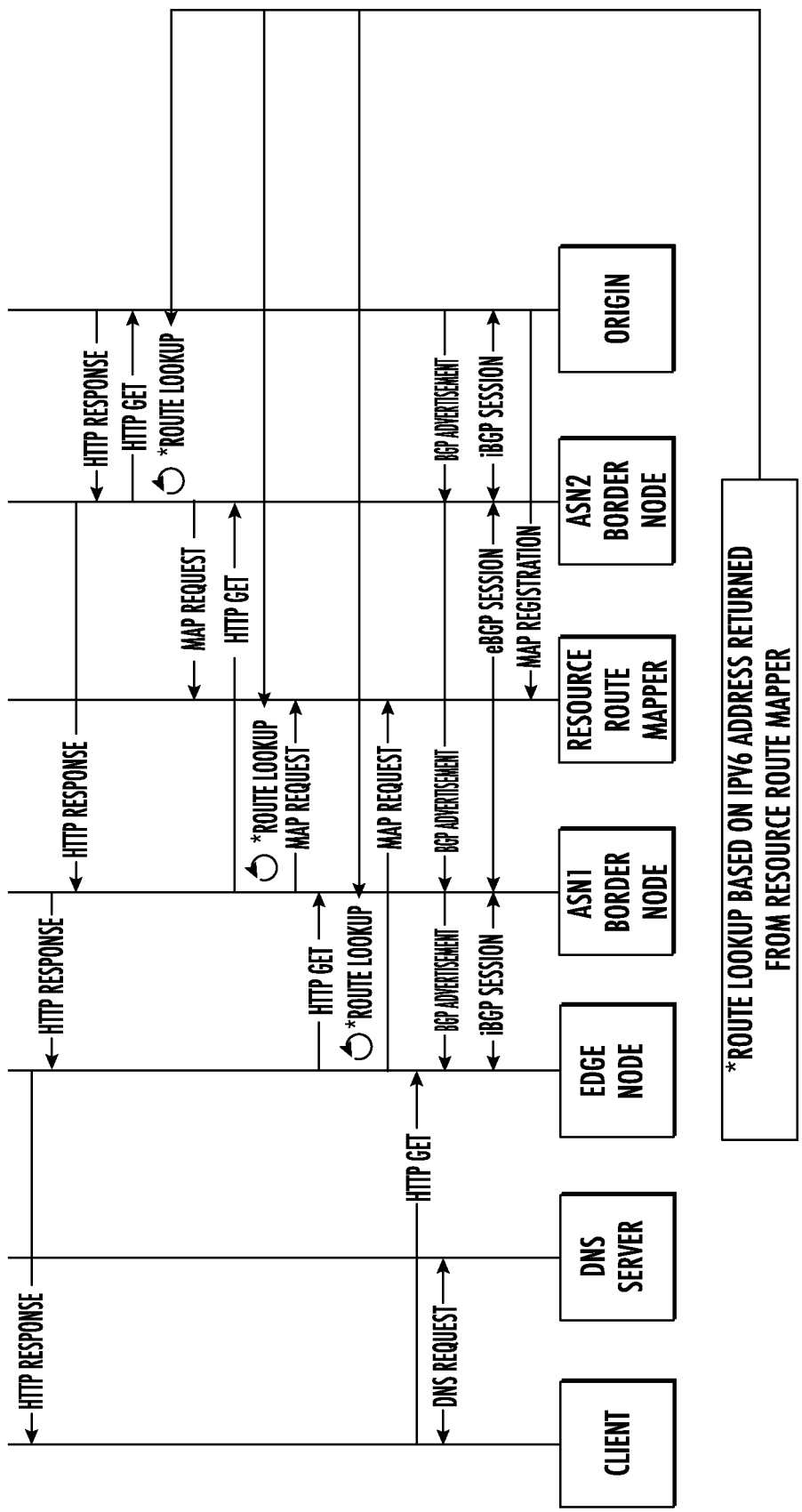

*AS THIS IS A NON-RR CDN SCENARIO, HOW THE CLIENT IS DRAWN TO THE CORRECT EDGE NODE IS OUT OF SCOPE OF THIS DOCUMENT

**THE RR ENABLED CDN USES THE DNS LOOKUP ON THE NON-RR CDN HOSTNAME TO FIND THE CORRECT NON RR EDGE

*AS THIS IS A NON-RR CDN SCENARIO, HOW THE CLIENT IS DRAWN TO THE CORRECT EDGE NODE IS OUT OF SCOPE OF THIS DOCUMENT

**THE RR ENABLED CDN USES THE DNS LOOKUP ON THE NON-RR CDN HOSTNAME TO FIND THE CORRECT NON-RR REDIRECTOR

***THE RR ENABLED CDN USED THE RECEIVED 302 REDIRECT TO FIND THE CORRECT NON-RR EDGE NODE

APPARATUS AND METHODS FOR PACKETIZED CONTENT ROUTING AND DELIVERY

RELATED APPLICATIONS

This application claims priority to U.S. Provisional Patent Application Ser. No. 62/635,430 filed Feb. 26, 2018 and entitled "APPARATUS AND METHODS FOR PACKETIZED CONTENT ROUTING AND DELIVERY," which is incorporated herein by reference in its entirety.

This application is also generally related to the subject matter of co-owned and co-pending U.S. patent application Ser. No. 13/958,467 filed on Aug. 2, 2013 and entitled "PACKETIZED CONTENT DELIVERY APPARATUS AND METHODS," now U.S. Pat. No. 9,467,369, and Ser. No. 14/537,735 filed Nov. 10, 2014 and entitled "PACKETIZED CONTENT DELIVERY APPARATUS AND METHODS", each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of content and/or data delivery over a network. More particularly, the present disclosure is related, in one exemplary aspect, to apparatus and methods for packetized content delivery via a network.

2. Description of Related Technology

The provision of content to a plurality of subscribers in a content distribution network is well known in the prior art. In a typical configuration, the content is distributed to the subscribers devices over any number of different topologies including for example: (i) Hybrid Fiber Coaxial (HFC) network, which may include e.g., dense wave division multiplexed (DWDM) optical portions, coaxial cable portions, and other types of bearer media; (ii) satellite network (e.g., from an orbital entity to a user's STB via a satellite dish); (iii) optical fiber distribution networks such as e.g., "Fiber to the X" or FTTx (which may include for example FTTH, FTTC, FTTN, and FTTB variants thereof); (iv) Hybrid Fiber/copper or "HFCu" networks (e.g., a fiber-optic distribution network, with node or last-mile delivery being over installed POTS/PSTN phone wiring or CAT-5 cabling); (v) microwave/millimeter wave systems; etc.

Various types of content delivery services are utilized in providing content to user or subscribers. For example, certain content may be provided according to a broadcast schedule (aka "linear" content). Content may also be provided on-demand (such as via video on-demand or VOD, free video on-demand, near video on-demand, etc.). Content may also be provided to users from a recording device located at a user premises (such as via a DVR) or elsewhere (such as via a personal video recorder or network personal video recorder disposed at a network location) or via a "startover" paradigm, which also affords the user increased control over the playback of the content ("non-linear").

Various systems and methods may be utilized for delivering media content to subscribers. For example, so-called "Internet Protocol Television" or "IPTV" is a system through which services are delivered to subscribers using the architecture and networking methods of an Internet Protocol Suite over a packet-switched network infrastructure (such as e.g., the Internet and broadband Internet access networks), instead of being delivered through traditional radio frequency broadcast, satellite signal, or cable television (CATV) formats. These services may include, for example, Live TV, Video On-Demand (VOD), and Interactive TV (iTV). IPTV delivers services (including video, audio, text, graphics, data, and control signals) across an access agnostic, packet switched network that employs the IP protocol.

So-called "over-the-top" or OTT delivery may also be used, wherein content from a third party source who may be unaffiliated with the network operator provides content directly to the requesting user or subscriber via the network operator's infrastructure, e.g., via an IP-based transport; i.e., the content is packetized and routed for delivery to the requesting user based on the user's network or IP address, such as via a high-speed DOCSIS cable modem, according to the well-known Internet Protocol network-layer protocol. IP unicasts (point to point) or multicasts (point to multiple points) have traditionally been used as the mechanism by which the OTT content is distributed over the network, via the user accessing a prescribed URL and logging in with their credentials to gain access to the content. The IP content is then streamed via the unicast/multicast to the requesting user(s), and received and decoded by a media player application program ("app") on the user's PC, laptop, or other IP-enabled end-user device.

There are many types of what could be considered "OTT" content delivery. Network operator-focused ("broadcast") OTT models typically uses subscriber ISPs (e.g., the cable MSO) to deliver OTT services. For this approach, OTT delivery may involve a tight coupling of application control, embedded securely in smart TVs or set-top boxes, and a cohesive primary content origination strategy. This typically includes a streaming video-based workflow that connects content publishing sources with the MSO content management system. This, in turn, is synchronized with the applications in the end-user or subscriber devices; content is presented in the form of an application-based electronic program guide (EPG) or other user interface on the user device.

Content delivery networks (CDNs) are used to deliver the aforementioned content to users or consumers thereof (which may include network entities such as JIT packagers or other processes, as well as end users/consumers). CDNs are typically comprises of an origin (e.g., origin server(s) which originates content, local or "edge" nodes or server(s) which are typically configured to locally cache content so as to, inter alia, reduce latency in the provision of the content and provide redundancy, and a service provider network or infrastructure to deliver the requested content to a distribution, point, user premises, or service area.

Extant CDN models for e.g., linear content delivery have been predicated on utilizing an "anycast" as a connection model for client-to-cache reachability; see e.g., co-owned and co-pending U.S. patent application Ser. No. 14/537,735 filed Nov. 10, 2014 and entitled "PACKETIZED CONTENT DELIVERY APPARATUS AND METHODS," previously incorporated herein, for exemplary anycast configurations. Typically, these anycast addresses are advertised via the border gateway protocol (BGP) from nodes allowed to serve the given resource(s). See, also Chandra, R, Traina, P. and Li., T, "BGP Communities Attribute", RFC 1997, DOI: 10.17487/RFC1997, August 1996, http://www.rfc-editor.org/info/rfc1997, and Bradner, S., "Key words for use in RFCs to Indicate Requirement Levels", BCP 14, RFC 2119, DOI 10.17487/RFC2119, March 1997, http://www.rfc-editor.org/info/rfc2119, each of the foregoing incorporated herein by reference in its entirety.

Nodes that are unable to support the required load, due to e.g., over-utilization or a fault, are able to withdraw any or all advertised routes to reduce their load. Such network route advertisements represent an arbitrary grouping of resources (which can be as large as e.g., "all linear resources" or as specific as e.g., a program channel such as "CNN™"); however, this granularity is limited by the number of addresses available, specifically in one instance under the Internet Protocol Version 4 (IPv4, set forth in RFC 791). This approach presents significant limitations, however, especially in the context of resource-level technical (e.g., operational) and business decision-making processes, and further does not provide a common control plane for inter-CDN communication.

SUMMARY

The present disclosure addresses the foregoing needs by disclosing, inter alia, apparatus and methods for managing a packetized content delivery network using a network protocol having enhanced addressing space and resource granularity.

In one aspect of the disclosure, a method of operating a data network is disclosed. In one embodiment, the network is comprised of one or more content delivery networks (CDNs), and the method includes use of granular resource route (RR) mapping to advertise one or more resources within the network for delivery to, e.g., a client process such as a JIT (just in time) packager. In one variant, the RR mapping is accomplished utilizing an Internet addressing protocol having suitable address space (e.g., IPv6).

In a further aspect, a non-transitory computer-readable apparatus configured to store one or more computer programs thereon is disclosed. In one embodiment, the one or more computer programs include a plurality of instructions configured to, when executed, provide resource mapping for a plurality of network resource elements within one or more CDNs.

In yet another aspect, a network architecture for delivering packetized content is disclosed. In one embodiment, the network comprises one or more content delivery networks, and includes a multi-tiered configuration with the capability of distributing content resources to network clients via a plurality of routes based on resource-specific advertisements.

In a further aspect, an RR mapping entity is disclosed. In one embodiment, the mapping entity comprises a computerized network device maintained by a CDN or managed network operator such as an MSO, and which is configured to resolve IPv6 addresses for individual resources within the CDN/managed network(s).

In yet another aspect, methods of address de-aggregation (for, inter alia, providing affinity within the CDN) are disclosed.

In another aspect of the present disclosure, computerized node apparatus is disclosed. In one embodiment, the computerized node apparatus includes: network interface apparatus; route manager apparatus; digital processor apparatus in data communication with at least the network interface apparatus; and storage apparatus in data communication with the digital processor apparatus and comprising at least one computer program, the at least one computer program configured to, when executed by the digital processor apparatus, cause the computerized node apparatus to at least: receive, from a computerized client device, data representative of a request for a resource; transmit, to a computerized mapping process, data representative of a mapping request for an Internet Protocol (IP) address; based at least on the IP address, perform a route lookup to determine at least one routing path to access a computerized route server apparatus; and transmit, to the computerized route server apparatus, data representative of a request for the computerized route server apparatus to backfill the resource so as to provide access to the resource by the computerized client device.

These and other aspects become apparent when considered in light of the disclosure provided herein.

BRIEF DESCRIPTION OF THE DRAWINGS

FIG. 12*b* is a ladder diagram illustrating one embodiment of message flow for the geographic location-aware DNS client routing architecture of FIG. 12*a*, according to the present disclosure.

Figure 1:
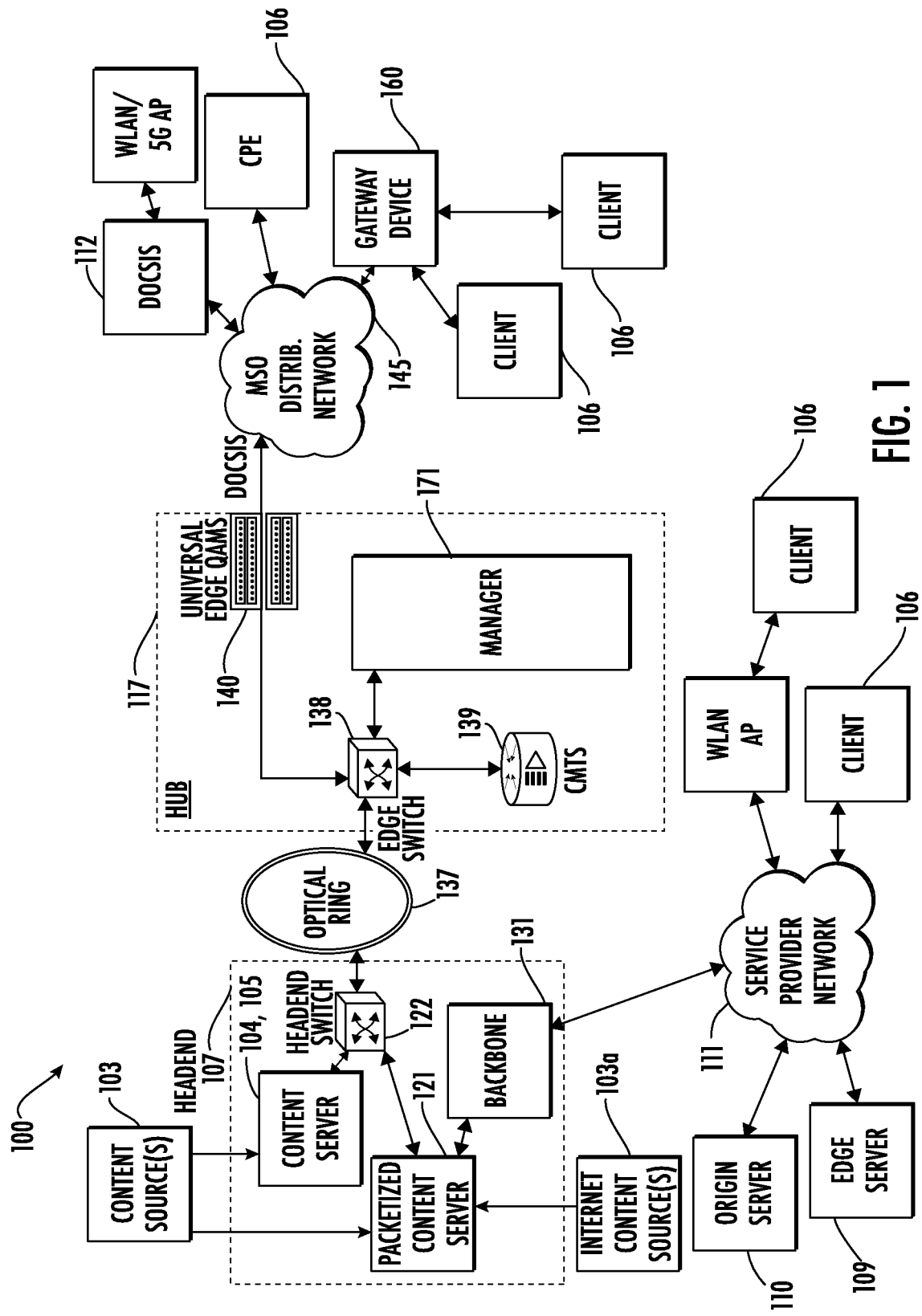
FIG. 1 is a functional block diagram of an exemplary MSO network architecture useful in conjunction with various features described herein.

All figures © Copyright 2017-2018 Charter Communications Operating, LLC. All rights reserved.

DETAILED DESCRIPTION

Reference is now made to the drawings wherein like numerals refer to like parts throughout.

As used herein, the term "application" refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the terms "client device" and "end user device" include, but are not limited to, set top boxes (e.g., DSTBs), personal computers (PCs), and minicomputers, whether desktop, laptop, or otherwise, and mobile devices such as handheld computers, tablets, "phablets", PDAs, personal media devices (PMDs), and smartphones.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (e.g., BREW), and the like.

The term "Customer Premises Equipment (CPE)" refers to any type of electronic equipment located within a customer's or user's premises and connected to a network, such as set-top boxes (e.g., DSTBs or IPTV devices), televisions, cable modems (CMs), embedded multimedia terminal adapters (eMTAs), whether stand-alone or integrated with other devices, Digital Video Recorders (DVR), gateway storage devices (Furnace), and ITV Personal Computers.

As used herein, the terms "Internet" and "internet" are used interchangeably to refer to inter-networks including, without limitation, the Internet.

As used herein, the term "memory" or "storage" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, and application-specific integrated circuits (ASICs). Such digital processors may be contained on a single unitary IC die, or distributed across multiple components.

As used herein, the terms "MSO" or "multiple systems operator" refer without limitation to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, LTE/LTE-A, WAP, SIP, UDP, FTP, RTP/RTCP, H.323, etc.).

As used herein, the term "network interface" refers to any signal or data interface with a component or network including, without limitation, those of the Firewire (e.g., FW400, FW800, etc.), USB (e.g., USB2), Ethernet (e.g., 10/100, 10/100/1000 (Gigabit Ethernet), 10-Gig-E, etc.), MoCA, Serial ATA (e.g., SATA, e-SATA, SATAII), Ultra-ATA/DMA, Coaxsys (e.g., TVnet™), radio frequency tuner (e.g., in-band or OOB, cable modem, etc.), Wi-Fi (802.11a,b,g,n), Wi-MAX (802.16), PAN (802.15), cellular (e.g., LTE/LTE-A, 3GPP, 3GPP2, UMTS), CBRS, or IrDA families.

As used herein, the term, "resource(s)" is used to refer, without limitation, to one or more content elements or chunks, or apparatus or processes or services configured to deliver or enable access to or provision of such.

As used herein, the term "server" refers to any computerized component, system or entity regardless of form which is adapted to provide data, files, applications, content, or other services to one or more other devices or entities on a computer network.

As used herein, the term "Wi-Fi" refers to, without limitation, any of the variants of IEEE-Std. 802.11 or related standards including 802.11 a/b/g/n/v.

As used herein, the term "wireless" means any wireless signal, data, communication, or other interface including without limitation Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, NFC (e.g., ISO 14443A/B), narrowband/FDMA, OFDM, PCS/DCS, LTE/LTE-A/TD-LTE, analog cellular, Zigbee, CDPD, satellite systems, millimeter wave or microwave systems, acoustic, and infrared (i.e., IrDA).

DETAILED DESCRIPTION OF EXEMPLARY EMBODIMENTS

Exemplary embodiments of the apparatus and methods of the present disclosure are now described in detail. While these exemplary embodiments are described in the context of a managed hybrid fiber coax (HFC) cable system architecture having a multiple systems operator, digital networking capability, and plurality of client devices/CPE, the general principles and advantages of the disclosure may be extended to other types of networks and architectures, whether broadband, narrowband, wired or wireless, terrestrial or satellite, managed or unmanaged (or combinations thereof), or otherwise, the following therefore being merely exemplary in nature.

It will also be appreciated that while described generally in the context of institutional service provision (e.g. academic, commercial, government, non-profit, etc.), the present disclosure may be readily adapted to other types of environments (e.g., home networks, etc.) as well. Myriad other applications are possible.

Further, although described in the context of service provision over an externally managed network, the architectures and techniques described herein may be readily applied to internal network management. The external managed network embodiments presented are merely used to demonstrate the flexibility and general applicability of the principles described herein (e.g. may be implemented with or without full administrator control of a network), and should not be considered in any way limiting.

Also, while certain aspects are described primarily in the context of the well-known Internet Protocol (described in, inter alia, RFC 791 and 2460), it will be appreciated that the present disclosure may utilize other types of protocols (and in fact bearer networks to include other internets and intranets) to implement the described functionality.

Finally, while aspects of the present disclosure are described with respect to IP video resources, the apparatus and methods described herein are extensible to any resource that may be represented by an (e.g., IP) address including, but not limited to other file types (images, documents, audio files), network resources (including potential substitution for Layer-4 port numbers), and even portions of a mass storage device (e.g., sectors or blocks on an HDD).

Overview—

As noted above, current models of grouping sets of resources (e.g., linear services or content in the current example) does not provide specific enough control of resources for technical/operational and business purposes. One operational example of this limitation is that the scope of a resource set does not align with the narrowing nature of resource availability as one approaches the origin of a resource. In one extant configuration, all linear resource (~4500 services) are represented by 32 IP addresses (e.g., 71.74.45.128/28 and 2001:1998:0AFF::0/124), which is functional for CDN nodes—as all nodes have access to all resources—however; this approach breaks down at the origin (packager process) layer. Specifically, packager entities/processes are each responsible for a subset of services, typically on the order of 100 services or so. This means that resource advertisement mechanisms cannot be used at this layer. The "atomic" or basic unit for linear delivery can be considered to be a content element "chunk," and it is some cases desirable to operate at this comparatively high level of granularity.

Hence, moving to a model where resources are discretely represented (e.g., with IP addresses, such as those afforded under the IPv6 protocol) advantageously allows for, inter alia, direct advertisement of resources while also benefiting from IP's inherent aggregatable nature. Exemplary solutions described herein further advantageously (i) continue leveraging of extant BGP aspects of the network, and/or (ii) make use of a common control plane, which can be utilized for example by different CDN operators and different delivery components to advertise resources.

Moreover, internally within a given CDN, several benefits may be realized through increased granularity of resource addressing/advertisement, including: (i) resource affinity (i.e., the same types of requests will be routed to the same nodes, thereby ostensibly improving efficiency and customer/subscriber experience); (ii) resource-level balancing (nodes of the network can shift traffic at a resource level or on a per-resource basis, allowing for fine grain leveling); (iii) dynamic resource scoping (nodes can choose to serve requests or allow a higher tier to serve requests based on popularity, preventing low-popularity resource from "polluting" or diluting the cache); and (iv) "zero-touch" provisioning and resource relocation (i.e., allowing nodes to advertise resources removes the need for static configuration of resource origination, thereby obviating many changes required under extant approaches.

Further, use of a common control plane advantageously allows CDN operators and resource providers to dynamically advertise resources to other operators. Specifically, many of the requirements for IP interconnecting apply directly to resource peering. IP peering provides, inter alia, mechanisms enabling control of peering, as well as logic for which (resource or route) announcements are accepted at prescribed locations or components of the network. Moreover, it provides a mechanism for allowing both the announcer and receiver of routes to assert a preference for one advertisement over another. Additionally, the BGP community attribute provides a mechanism to convey additional metadata about a given resource, which may be informational or directive. Finally, leveraging route aggregation can advantageously be used to limit the number of routes in the "resource routing table," as one CDN need only know about the aggregate a peer CDN is using—explicit knowledge of specific resource reachability within that resource domain is unnecessary, thereby simplifying the supporting architecture and protocols.

As described in greater detail below, two exemplary mechanisms for the naming of a resource, and the ability to map that naming to an IPv6 address, are set forth herein, although other approaches may be recognized by those of ordinary skill given the present disclosure.

Service Provider Network—

FIG. 1 illustrates a typical service provider network configuration useful with the features of the enhanced resource addressing and advertisement apparatus and methods described herein.

This service provider network 100 is used in one embodiment of the disclosure to provide both delivery of linear and other types of content to network users or subscribers, as well as other functions such as backbone and backhaul from the service provider's service nodes, such as HFC cable or FTTC/FTTH drops to different premises or venues/residences. In certain embodiments, the service provider network 100 also advantageously permits the aggregation and/or analysis of subscriber- or account-specific data (including inter alia, particular DOCSIS modem, CPE, and or mobile client devices associated with such subscriber or accounts) as part of the provision of services to users under the exemplary delivery models described herein. As but one example, device-specific IDs (e.g., network-based IDs, MAC address or the like) can be cross-correlated to MSO subscriber data maintained at e.g., the network head end(s) 107 so as to permit or at least facilitate, among other things, (i) user/device authentication to the MSO network; (ii) correlation of aspects of the area, premises or venue where the services is/are provided to particular subscriber capabilities, demographics, or equipment locations, such as for delivery of location-specific or targeted content or advertising; and (iii) determination of subscription level, and hence subscriber privileges and access to certain services as applicable.

Moreover, device profiles for particular devices can be maintained by the MSO, such that the MSO (or its automated proxy processes) can model the device for rendering/decoding, DCAS/DRM/encryption, wireless, or other capabilities.

The MSO network architecture 100 of FIG. 1 is particularly useful for the delivery of packetized content (e.g., encoded digital content carried within a packet or frame structure or protocol) consistent with the various aspects of the present disclosure. In addition to on-demand and broadcast content (e.g., live video programming), the system of FIG. 1 may deliver Internet data and OTT (over-the-top) services to the end users via the Internet protocol (IP) and TCP (i.e., over the DOCSIS or in-band QAM bearer), although other protocols and transport mechanisms of the type well known in the digital communication art may be substituted.

The network architecture 100 of FIG. 1 generally includes one or more headends 107 in communication with at least one hub 117 via an optical ring 137. The distribution hub 117 is able to provide content to various "client" devices 106 (which may include CPE such as DSTBs or the like), and gateway devices 160 as applicable, via an interposed network infrastructure 145.

In the MSO network 100 of FIG. 1, various content sources 103, 103a are used to provide content to content servers 104, 105 and origin servers 121. For example, content may be received from a local, regional, or network content library as discussed in co-owned U.S. Pat. No. 8,997,136 entitled "APPARATUS AND METHODS FOR PACKETIZED CONTENT DELIVERY OVER A BANDWIDTH-EFFICIENT NETWORK", which is incorporated herein by reference in its entirety. Alternatively, content may be received from linear analog or digital feeds, as well as third party content sources. Internet content sources 103a (such as e.g., a web server) provide Internet content to a packetized content origin server(s) 121. Other IP content may also be received at the origin server(s) 121, such as voice over IP (VoIP) and/or IPTV content. Content may also be received from subscriber and non-subscriber devices (e.g., a PC or smartphone-originated user made video).

The network architecture 100 of FIG. 1 may further include a legacy multiplexer/encrypter/modulator (MEM; not shown). In the present context, the content server 104 and packetized content server 121 may be coupled via a LAN to a headend switching device 122 such as an 802.3z Gigabit Ethernet (or "10 G") device. For downstream delivery via the MSO infrastructure (i.e., QAMs), video and audio content is multiplexed at the headend 107 and transmitted to the edge switch device 138 (which may also comprise an 802.3z Gigabit Ethernet device) via the optical ring 137.

In one exemplary content delivery paradigm, MPEG-based video content (e.g., MPEG-2, H.264/AVC) may be delivered to user IP-based client devices over the relevant physical transport (e.g., DOCSIS channels); that is as MPEG-over-IP-over-MPEG. Specifically, the higher layer MPEG or other encoded content may be encapsulated using an IP network-layer protocol, which then utilizes an MPEG packetization/container format of the type well known in the art for delivery over the RF channels or other transport, such as via a multiplexed transport stream (MPTS). Delivery in such packetized modes may be unicast, multicast, or broadcast.

Individual devices such as cable modems 112 and clients/CPE 106 of the implementation of FIG. 1 may be configured to monitor the particular assigned RF channel (such as via a port or socket ID/address, or other such mechanism) for IP packets intended for the device/subscriber premises/address that they serve. The IP packets associated with Internet services are received by edge switch, and forwarded to the cable modem termination system (CMTS) 139. The CMTS examines the packets, and forwards packets intended for the local network to the edge switch. Other packets are in one variant discarded or routed to another component.

The edge switch forwards the packets receive from the CMTS to the QAM modulator, which transmits the packets on one or more physical (QAM-modulated RF) channels to the "client" CM or CPE devices 112, 106. The IP packets are typically transmitted on RF channels that are different than the "in band" RF channels used for the broadcast video and audio programming, although this is not a requirement.

In parallel with (or in place of) the foregoing delivery mechanisms, the MSO backbone 131 and other network components can be used to deliver packetized content to "client" devices via non-MSO networks. For example, so-called "OTT" content (whether tightly coupled or otherwise) can be ingested, stored within the MSO's network infrastructure, and delivered to the user's mobile device via an interposed service provider network (which may include a public Internet) 111 (e.g., at a local coffee shop, via a WLAN AP connected to the coffee shop's service provider via a modem, with the user's IP-enabled end-user device utilizing an Internet browser or MSO/third-party app to stream content according to an HTTP-based approach over the MSO backbone 131 to the third party network to the service provider modem (or optical demodulator) to the WLAN AP.

The network architecture 100 also has access to both third-party edge devices (e.g., edge servers 109) and origin servers 110. As is known, content is often cached at a "local" cache and served therefrom, to among other things reduce latency in serving content requested by users via the client devices 106. Edge caches 109 receive the cached content from an origin device 110, although other sources may also be used. It will be appreciated that while the architecture 100 of FIG. 1 shows the origin and edge servers being outside of the managed MSO network, one or more of such servers may reside within the MSO network (i.e., be managed by the MSO). Moreover, other entities shown such as the content/Internet content sources 103, 103a, packetized content server 121, and content servers 104, 105 may operate as origin servers. Likewise, the hub 117 shown in FIG. 1 may include caching apparatus and itself act as an edge server device. Multiple different topological and functional approaches may be used consistent with the methods and apparatus of the present disclosure.

Methods and apparatus for the switched delivery of content may also be utilized consistent with the present disclosure. For example, only that content for which there is at least one request from a user device may be provided. In one embodiment, the methods and apparatus disclosed in co-owned, co-pending U.S. patent application Ser. No. 09/956,688 entitled "TECHNIQUE FOR EFFECTIVELY PROVIDING PROGRAM MATERIAL IN A CABLE TELEVISION SYSTEM" and filed on Sep. 20, 2001, which is incorporated herein by reference in its entirety, may be utilized for providing "switched" delivery of the IP content. For example, a mechanism may be employed whereby the delivery of a session is based at least in part on logic to determine whether any users for the session are active; e.g., a multicast with no remaining "viewers" (or session participants) may be collapsed, and the bandwidth reclaimed.

Figure 1A:
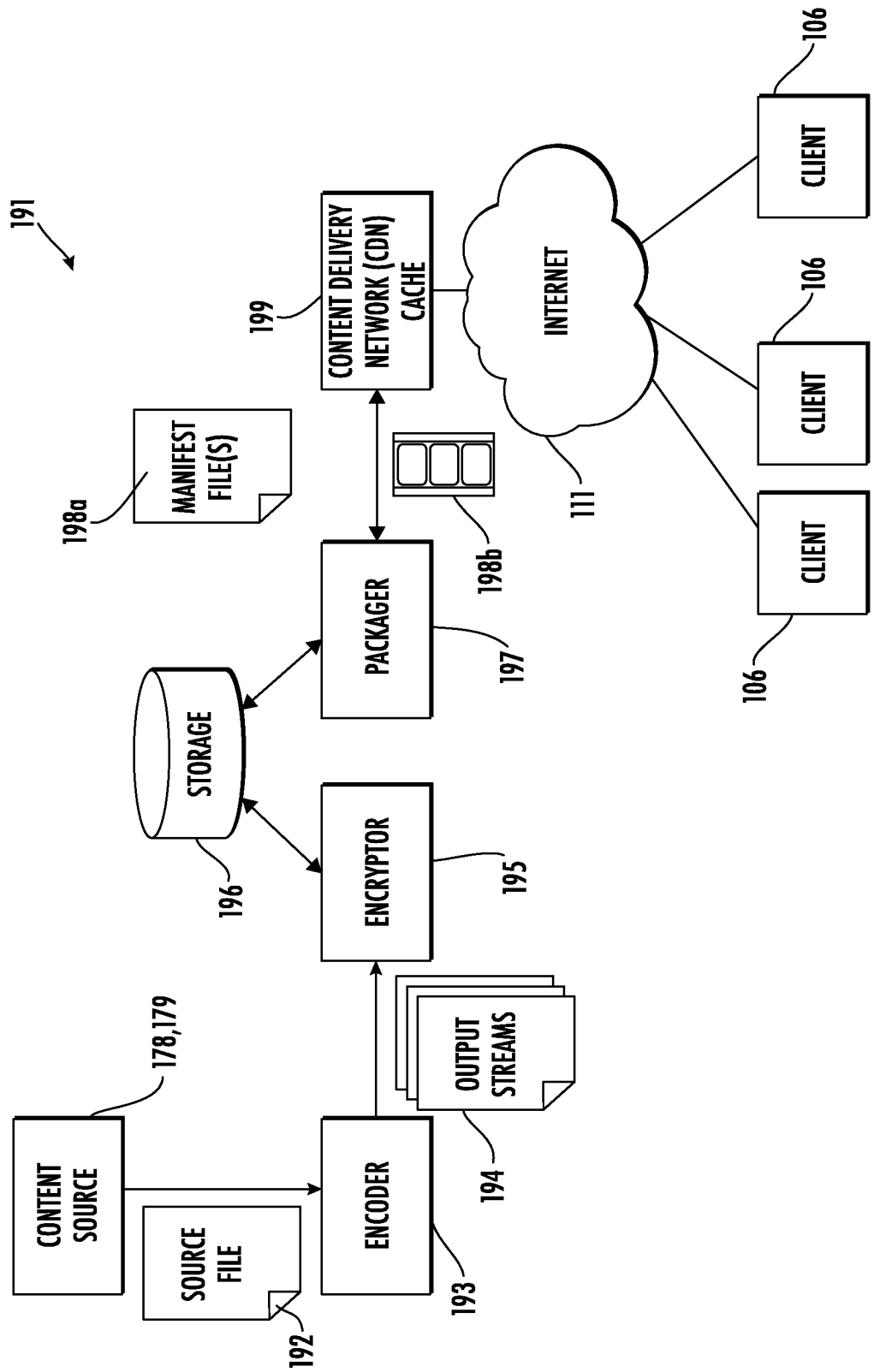
FIG. 1a discloses an exemplary configuration of an architecture for providing video or other media content to client devices via a content delivery network (CDN), according to one embodiment of the present disclosure.

FIG. 1a illustrates an exemplary configuration of an architecture 191 for providing video or other media content to client devices 106 via a content delivery network (CDN). The content provision entities (e.g., packager(s) 197) are in communication with client devices 106 via the distribution network 111 and the CDN cache 199. In one embodiment of the present disclosure, the distribution network 111 comprises an internet, such as e.g., the Internet as shown in FIG. 1. While described in the context of an Internet Protocol network, it will be recognized that the principles of the disclosure may be extended to other transport modalities and network paradigms.

The requesting client device 106c may include home gateway devices 120 (see FIG. 1c) and/or media-enabled client devices. Such media-enabled client devices may include, without limitation, tablets, phablets, smart phones, smart televisions (TVs), desktop and laptop personal computers (PC), and portable media players. In another embodiment, the media client device may comprise a file server; file servers are common in both commercial and residential use. For example, a subscriber may have a PC which can play media files, but which also serves his/her other consumer electronics (e.g., smart phone and tablet).

In one embodiment of the present disclosure, an encoder process 193 encodes a source file 192 from a content source 178, 179 into at least one encoding format (e.g., transcodes a source file from one format to at least one other format). In another variant, the source file 192 is encoded into a plurality of encodings that correspond to a respective plurality of one or more device types, codecs, resolutions, file formats, audio encodings, bit rates, etc. The variety of encodings may be utilized by the CDN cache 199 (and the packager 197) via adaptive bitrate (ABR) streaming.

As a brief aside, video compression is used in many current and emerging products, such as digital television set-top boxes (DSTBs), digital satellite systems (DSSs), high definition television (HDTV) decoders, mobile devices such as tablets, smartphones, and personal media devices (PMDs), digital versatile disk (DVD) players, video conferencing, Internet video and multimedia content, and other digital video applications. Without video compression, digital video content can be extremely large, making it difficult or even impossible for the digital video content to be efficiently stored, transmitted, or viewed. Such compression typically comes at the price of loss of information present in the original (non-compressed) version, and hence are "lossy."

There are numerous video coding methods that compress digital video content. Consequently, video coding standards have been developed to standardize the various video coding methods so that the compressed digital video content is rendered in formats that a majority of video decoders can recognize. For example, the Motion Picture Experts Group (MPEG) and International Telecommunication Union (ITU-T) have developed video coding standards that are in wide use. Examples of these standards include the MPEG-1, MPEG-2, MPEG-4, ITU-T H.261, and ITU-T H.263 standards. The MPEG-4 Advanced Video Coding (AVC) standard (also known as MPEG-4, Part 10) is a newer standard jointly developed by the International Organization for Standardization (ISO) and ITU-T. The MPEG-4 AVC standard is published as ITU-T H.264 and ISO/IEC 14496-10. For purposes of clarity, MPEG-4 AVC is referred to herein as H.264.

Most modern video coding standards, such as H.264, are based in part on a temporal prediction with motion compensation (MC) algorithm. Temporal prediction with motion compensation is used to remove temporal redundancy between successive frames in a digital video broadcast. The temporal prediction with motion compensation algorithm includes a motion estimation (ME) algorithm that typically utilizes one or more reference pictures to encode a particular picture. A reference picture is a picture that has already been encoded. By comparing the particular picture that is to be encoded with one of the reference pictures, the temporal prediction with motion compensation algorithm can take advantage of the temporal redundancy that exists between the reference picture and the particular picture that is to be encoded and encode the picture with a higher amount of compression than if the picture were encoded without using the temporal prediction with motion compensation algorithm.

Motion estimation in an encoder is typically a computationally intensive process, and hence where speed and reduced processing overhead are desired, reduction or even removal of motion compensation processing can greatly expedite e.g., display or rendering of video data.

Adaptive bitrate (ABR) streaming is a technique to distribute program content over a large distributed network. Multiple bitrates of a particular piece of content are available to stream to a viewer, and the selection of the bit rate is based on current network conditions. This means that when there is greater bandwidth availability, a larger bitrate version of the content may be selected. If available bandwidth narrows, a lower bitrate (i.e., smaller) version of the content may be selected to provide a seamless user experience. Non-limiting examples of ABR streaming include, without limitation, MPEG-Dynamic Adaptive Streaming over HTTP (DASH), Adobe® Dynamic Streaming for flash, Apple® HTTP Adaptive Streaming, Microsoft® Smooth Streaming, QuavStreams® Adaptive Streaming over HTTP, and upLynk®.

Returning again to FIG. 1a, a source file 192 from a content source is input to the encoder 193. Various content sources 178, 179 may provide source files 204 to the encoder 202. For example, content may be received from a local, regional, or network content library as discussed in co-owned U.S. Pat. No. 8,997,136 previously incorporated herein. Alternatively, content may be received from linear analog or digital feeds, as well as third party content sources. Internet content sources (such as e.g., a web server) may also provide Internet content to the encoder 193. In yet another embodiment, content may be received from subscriber and/or non-subscriber devices (e.g., a PC or smartphone-originated user made video).

The source file 192 may be encoded in a variety of formats (both audio and video), bit rates, resolutions, which are each playable on a variety of devices. Accordingly, one or more output streams 194 are produced by the encoder 193. For example, a content delivery network may enable a wide variety of user devices to play a certain piece of content. Accordingly, a network operator selects to have the encoder 193 encode the content into multiple formats for use on the variety of players. In a further embodiment, a network operator selects to utilize adaptive bitrate streaming such that multiple bit rate streams are utilized by selecting an optimized stream from the output streams 194, e.g., the stream that best utilizes the viewer's device and current bandwidth constraints to provide an optimal playback experience. The optimization occurs via a process or application running at the encoder 193.

While output streams 194 are shown as separate files (for example MPEG 4 transport stream (.ts) files), in a further embodiment of the present disclosure, all of the streams (i.e., streams 194) are presented in a single "super" file. Having a single comprehensive file comprising multiple streams, inter alia, lowers the number of files the CDN cache 199 must manage.

The encoder 193 may encode output streams 194 with audio tracks (e.g., AC3 audio). Different encoding formats and bit rates may be selected based on the requirements of the stream, end user equipment, and the protocols and formats used by the CDN cache 199.

The encoded output streams 194 are also optionally encrypted by an encryptor 195 via an encryption algorithm (e.g., AES, DES, public key encryption, etc.). The encoded and encrypted output streams are stored in a storage device 196. In one embodiment, the functionality of both the encoder 193 and the encryptor 195 may be integrated into a single apparatus.

The stored output streams are utilized by a packager 197 to provide a manifest (or index/playlist) file 198a and video segments 198b to a requesting client device 106c. Specifically, the manifest file 198 is a data structure comprising a listing of addresses for each of the video segments 198b of a stream of data, and includes information about the video segments such as bitrates, closed captioning, audio, etc. Different ABR models may use different manifest files. For example, with HTTP Smooth Streaming (HSS), each of the components (closed captioning, audio, etc.) are in separate files with addresses for each in the manifest file 198a. With HTTP Live Streaming (HLS), audio is embedded in the segments 198b and thus are not separately listed in the manifest file.

In another embodiment, the manifest file 198a includes metadata, and a listing of media segment entries. Common examples of metadata include e.g., version information, protocol, file formats, supported codecs, resolution, encryption, temporal information (transmission time, time of presentation, time stamps, etc.), geographic information (restricted locations, locations for presentation, etc.), content type indicia, synchronization information, control data, etc. Stated differently, the metadata describes the media segments 198b and can be used as a reference file when assessing or otherwise making use of the media segments 198b. In one implementation (described in greater detail subsequently herein), the metadata may include data and be structured so as to aid the cognizant latency management entity, whether client-side or network-side), with facilitating various mechanisms of switching latency reduction.

The list of media segment entries in the manifest file 198a comprises a list of network addresses (which may be remote or local) where the corresponding segments 198b of media content may be accessed and/or downloaded. For instance, each of the media segment entries may be listed by a Uniform Resource Locator (URL). In some embodiments, the entries may be in computing resource "path" format. Computing paths may be either absolute (i.e., the path provides the fully elaborated and unique location of the segment 198b in a file structure) or relative (i.e., the path provides a relative location of the segment in a file structure). Additionally, in some embodiments, the entries may be in symbolic format, such that at least a portion of the entry must be further interpreted (i.e., is not human-readable). Common examples of this may include e.g., HyperText Markup Language (HTML) tags, proprietary tags, Java, Javascript, etc. Moreover, some implementations may substitute or intermingle any of the foregoing techniques to flexibly accommodate various operational models. As described in greater detail subsequently herein), the URLs or other network addresses may be selectively chosen so as to minimize latency due to e.g., "path hops" or other sources of delay in accessing and rendering the referenced portion of the content.

In another embodiment, the ostensibly "unified" service provider (e.g., Charter) may be a conglomeration of multiple logical entities. Multiple logical entities may be useful to further distribute services over various network resources or enable additional features provided by partnered corporations or providers. Multiple logical entities, for example, may provide local content for a particular service group or geographic area; having content providing entities closer to end users offers lower latency and may add network redundancy. Common examples of network resources include e.g., broadcast, multicast, video-on-demand, advertisement services, local services, etc. In one specific example, one exemplary stream manifest file may include entries from: www.charter.com, vod.charter.com (video on demand services), www.nhk.jp ($3^{rd}$ party content), www.adserver.com ($3^{rd}$ party advertisement services), etc. See, e.g., co-owned U.S. patent application Ser. No. 15/204,610 filed Jul. 7, 2016 and entitled "APPARATUS AND METHODS FOR PRESENTATION OF KEY FRAMES IN ENCRYPTED CONTENT," incorporated herein by reference in its entirety.

In another example, the media segment listing may include a listing of URL links which is further punctuated with HTML tags or Javascript, which is configured to aid in advertisement insertion and/or execution of complementary programming. For instance, the video client may substitute tailored locally stored advertisements for commercial breaks, rather than e.g., the default broadcasted commercial.

In the exemplary embodiment, each media segment 198b is an encoded and encrypted subsection or segment of media content. The media segments 198b, when decrypted, decoded, and played in the appropriate order, render the original media content. In one implementation, each media segment represents a portion of video associated with a specific resolution, codec, and time stamp. The media segments 198b are assembled according to a time stamp sequence.

The manifest files 198a listing all components for playback of a piece of content may be generated by the packager 197 based on the registration of a user. In an alternative embodiment, the manifest file 198a (or a plurality of manifest files) is pre-generated for use with one particular ABR format. The manifest files 198a are generated based on the specific device and requirements of an end user device. For example, the Microsoft® Xbox® 360 and Xbox® One video game systems require different manifest files to operate. Furthermore, different streaming standards may require different manifest files 198a to operate. For example, the MPEG-Dynamic Adaptive Streaming over Hyper Text Transfer Protocol (DASH) protocol may be implemented differently with respect to Hyper Text Transfer Protocol (HTTP) live streaming and Windows® Media Streaming. Thus, each may require different manifest files.

Media segments 198b are generated by the packager 197. The segments 198b may be of predetermined length. In addition, metadata describing the segments may be generated at the packager 197, or, alternatively at the encoder 193. As discussed herein, the media segments 198b form the basis for the generation of a manifest file 198a. It is appreciated, however, that the foregoing functionality may be accomplished at various other network entities (such as at the encoder 193 or CDN cache 199), the foregoing being merely exemplary.

In further embodiments, the encoder 193 may also break the encoded output streams 194 into segments 198b for use by the CDN cache 199 to serve to client devices 106c. Furthermore, the encoder 193 in such embodiments generates the manifest files 198a that reference the locations of the segments 198b.

In an exemplary embodiment, a media client of the type discussed in co-owned co-pending U.S. application Ser. No. 14/220,021 filed on Mar. 19, 2014 and entitled "APPARATUS AND METHODS FOR RECORDING A MEDIA STREAM", which is incorporated herein by reference in its entirety, may be utilized on the receiving client device 106c. The media client replays stored "segmented" media content based on a manifest file 198a. In one exemplary embodiment, stored video content streams segments 198b are decompressed for playback based on information stored within an associated data structure (e.g., stream manifest file 198a).

Resource Route (RR) Mapping Methods and Apparatus—

In one exemplary embodiment of the methods and apparatus described herein (see FIGS. 2a and 2b herein), URLs provided to clients (which may be for example network clients such as JIT packagers 197, such as for example those described in co-owned and co-pending U.S. patent application Ser. No. 15/689,733 filed Aug. 29, 2017 and entitled "APPARATUS AND METHODS FOR LATENCY REDUCTION IN DIGITAL CONTENT SWITCHING OPERATIONS" and incorporated herein by reference in its entirety, or others such as end-user clients 106) look much like they do under extant approaches. A first step in implementing the Resource Routing (RR) approach is for the origin 110 to register a URL with a resource-to-route mapping agent process 202 (e.g., a computerized process operative to run within the MSO network or under control of a third party service provider). In one exemplary implementation, this registration occurs via use of an API (e.g., input is provided to the API, and the API automatically returns to the inputting process data relating to the registration process/route mapping). The resource-to-route mapping agent assigns an IPv6 address to the URL (based in one variant on an arbitrary, configurable tuple extracted from the URL utilizing an extraction algorithm). The origin will then advertise, via the BGP to other nodes within the CDN, "reachability" to that IPv6 address. In one implementation, these advertisements are not made to the network devices themselves. Assuming for example a 2-stage CDN (edge tier, and origin), the foregoing advertisement is sufficient from the perspective of the control plane.

From a data plane perspective, a given client will first perform a DNS lookup on the hostname and, in one variant, resolve the hostname to an anycast address (IPv4 or IPv6, depending on the client). The client then issues an HTTP GET request to that resolved anycast address. When the edge cache (node) 109, 117 receives the issued request, it will make a call to the resource-to-route mapping agent entity, requesting the associated IPv6 address. After receiving the IPv6 address, the edge cache/node or its proxy will perform an IP route lookup routine, and find the selected route (from the origin) server. The edge cache/node will then use that origin server's IP address (based on the next-hop of the BGP route) as the upstream device, and send an HTTP GET request to that address for backfill fulfillment.

In one implementation, map caching mechanisms may be used to, inter alia, prevent the cache from needing to consult the mapping server for every request.

Figure 3A:
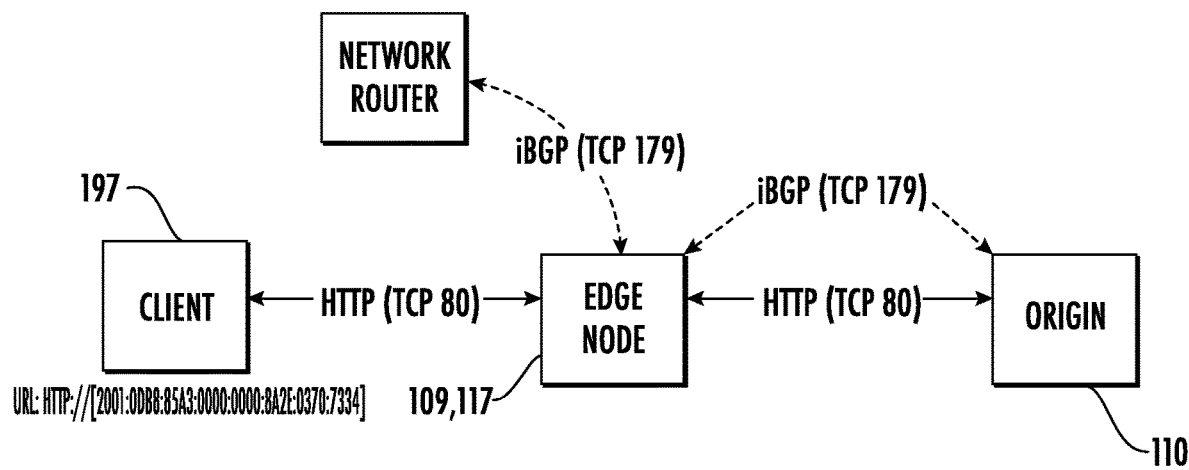
FIG. 3a is a logical block diagram illustrating one embodiment of literal hostname assignment architecture according to the present disclosure.
Figure 3B:
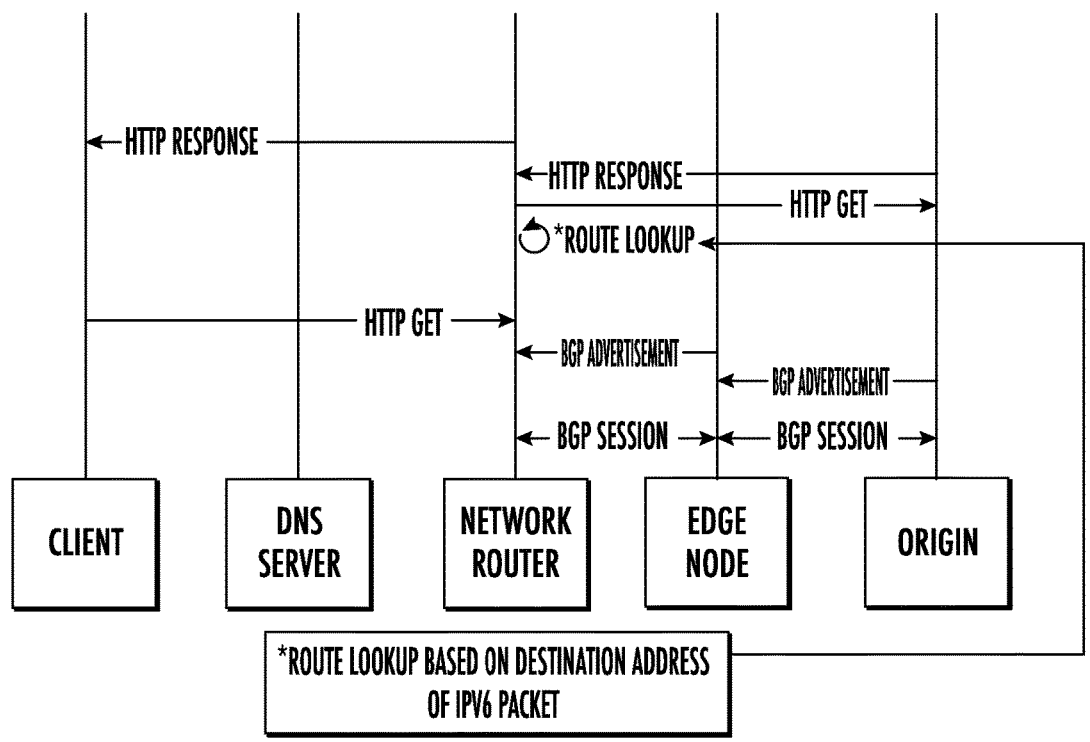
FIG. 3b is a ladder diagram illustrating one embodiment of literal hostname call flow according to the present disclosure.

In a second exemplary embodiment (see FIGS. 3a and 3b), the need for a mapping agent 202 of the type described above is precluded via use of a direct resource naming approach. URLs provided to the client (device or process) may be configured to take one of several forms including, but not limited to: (i) literal IPv6 insertion as the hostname ([2001:0db8:85a3:0000:0000:8a2e:0370:7334]), or (ii) insertion of the IPv6 address as the path portion of the URL (linear-scope010.timewarnercable.com/2001:0db8:85a3: 0000:0000:8a2e:0370:7334). These approaches have different use cases, offering different options depending on the client capabilities and fallback requirements.

In the former (literal hostname) approach (i), the client will simply make a request to that address; no other logic (including DNS) is required. The edge cache/node 117 receives the request and, identifying that this is an RR-based request, use the destination IP address as the route to look up; the process above is replicated, providing an origin 110 to the edge node 109, 117 for backfilling. A consequence of this model is that the specific routing information for that request must be known on the network equipment itself, as this is the destination address of the IP packet. This necessitates that at some point, e.g., at the edge, RR information be exposed to the network via BGP. This can be accomplished in one implementation using aggregation (as per-chunk routing will advertise too many routes), and explicitly requires IPv6 only. Additionally, this model requires a mechanism for maintaining HTTP persistence, as the TCP endpoint will be different for each HTTP GET request; however, these requirements are significantly offset by benefit to the client with respect to "edge affinity" as referenced above.

Figure 2A:
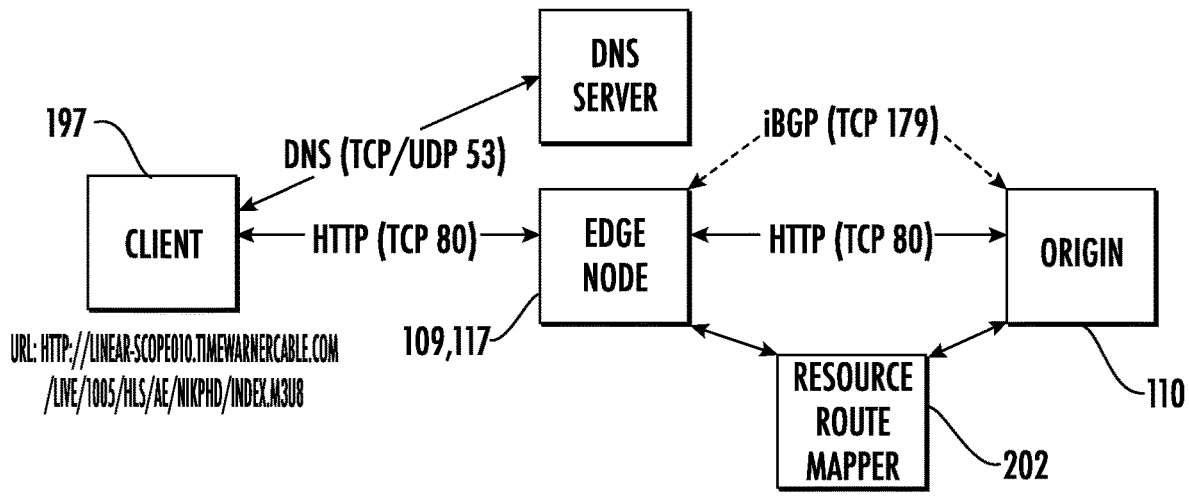
FIG. 2a is a logical block diagram illustrating one embodiment of resource route mapping architecture according to the present disclosure.
Figure 2B:
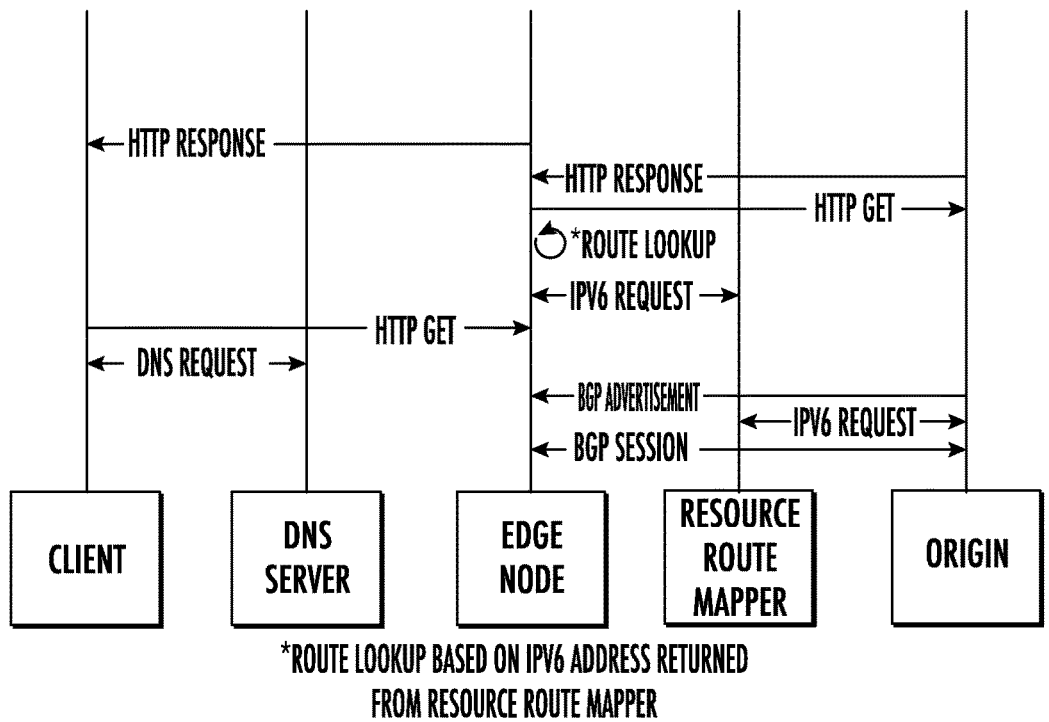
FIG. 2b is a ladder diagram illustrating one embodiment of resource route mapping call flow according to the present disclosure.
Figure 4A:
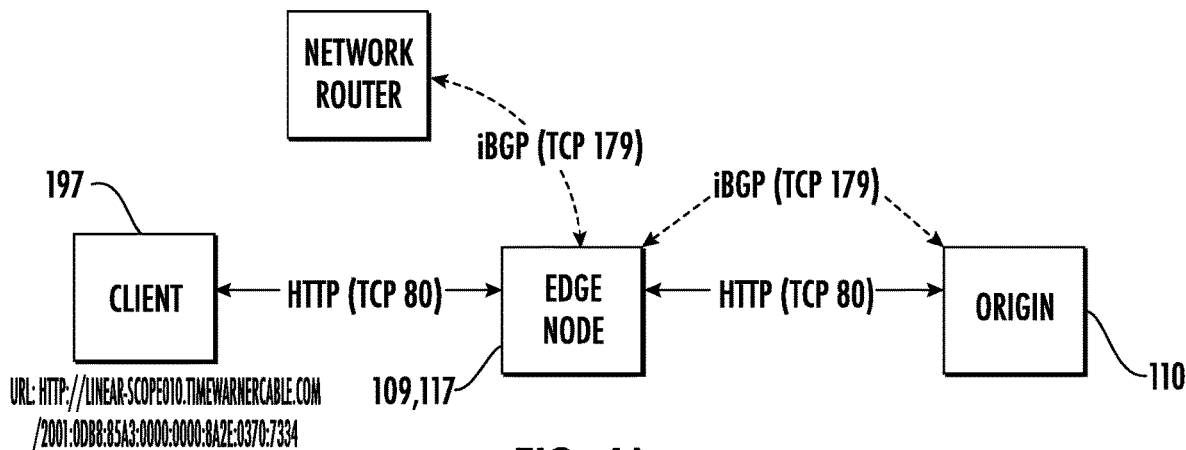
FIG. 4a is a logical block diagram illustrating one embodiment of an IPv6 encoded path determination architecture according to the present disclosure.
Figure 4B:
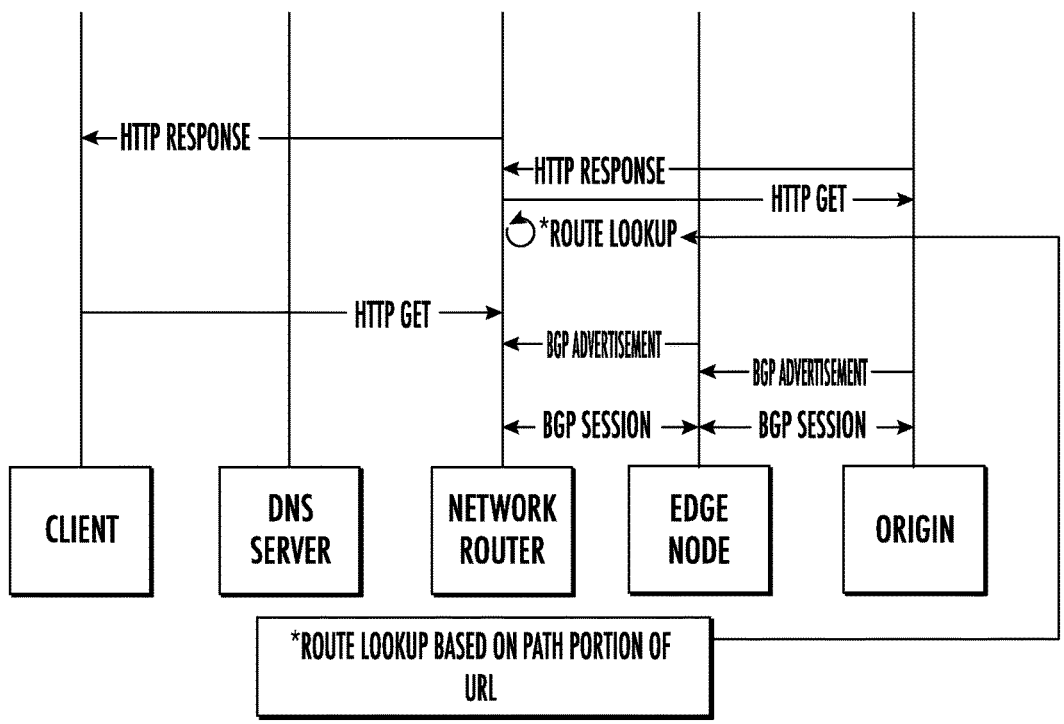
FIG. 4b is a ladder diagram illustrating one embodiment of an IPv6 encoded path call flow according to the present disclosure.

In the approach of FIGS. 4a and 4b, the hostname comprises a URL, which the client may use to resolve to an edge node, as described with respect to the "Resource Route Mapping" approach above for FIGS. 2a and 2b. IPv6-enabled and RR-aware clients can choose to instead use the "path" portion of the URL (which is in the exemplary implementation an IPv6 address) as the destination of the IP packet. For clients acting in this mode, the rest of the process is identical to the literal IPv6-as-hostname approach previously described, as is the process for the edge node to find the origin. Again, this requires that explicit routing information be available to the network for the given resource's IPv6 address. One advantage to this model is that it allows the client to decide which approach to implement; i.e., if it would like to utilize the RR model or, failing IPv6 support (or awareness of RR), fall back to a more traditional DNS approach. In this case, the client will resolve the hostname to a CDN edge node 109, 117, and issue the request. The CDN edge node may, after identifying that the designated path (route) appears to contain an RR-based IPv6 address, perform a route lookup on that address to find the correct origin. Unlike the literal hostname approach described supra, additional accommodations for HTTP persistence are not needed under this model; however, no client-to-edge affinity afforded either.

Figure 5A:
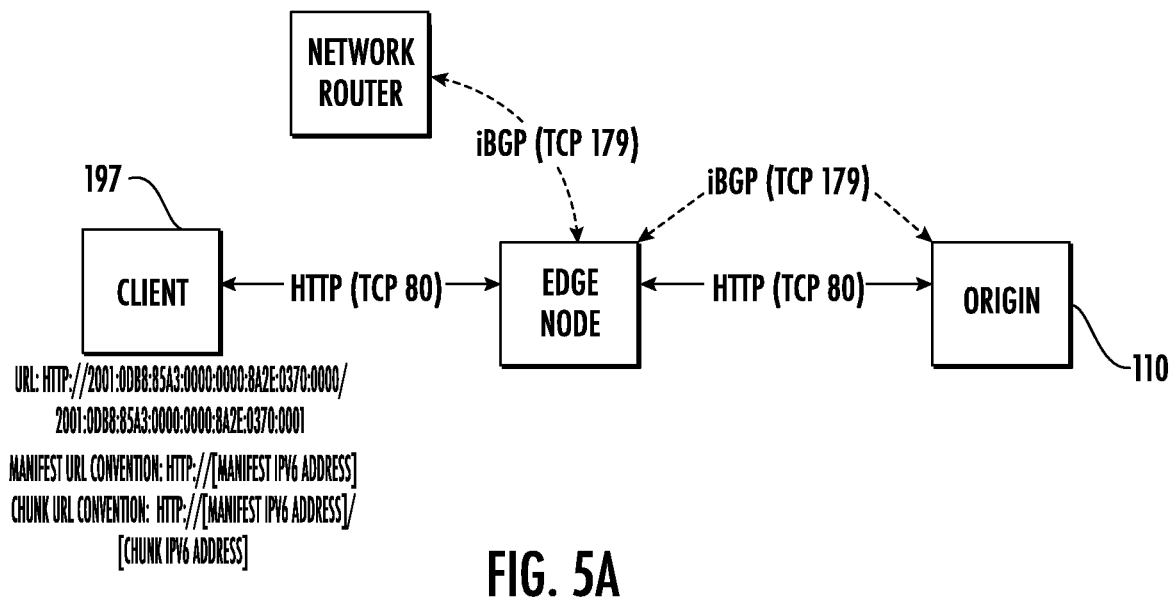
FIG. 5a is a logical block diagram illustrating one embodiment of a hybrid model of a route lookup architecture according to the present disclosure.
Figure 5B:
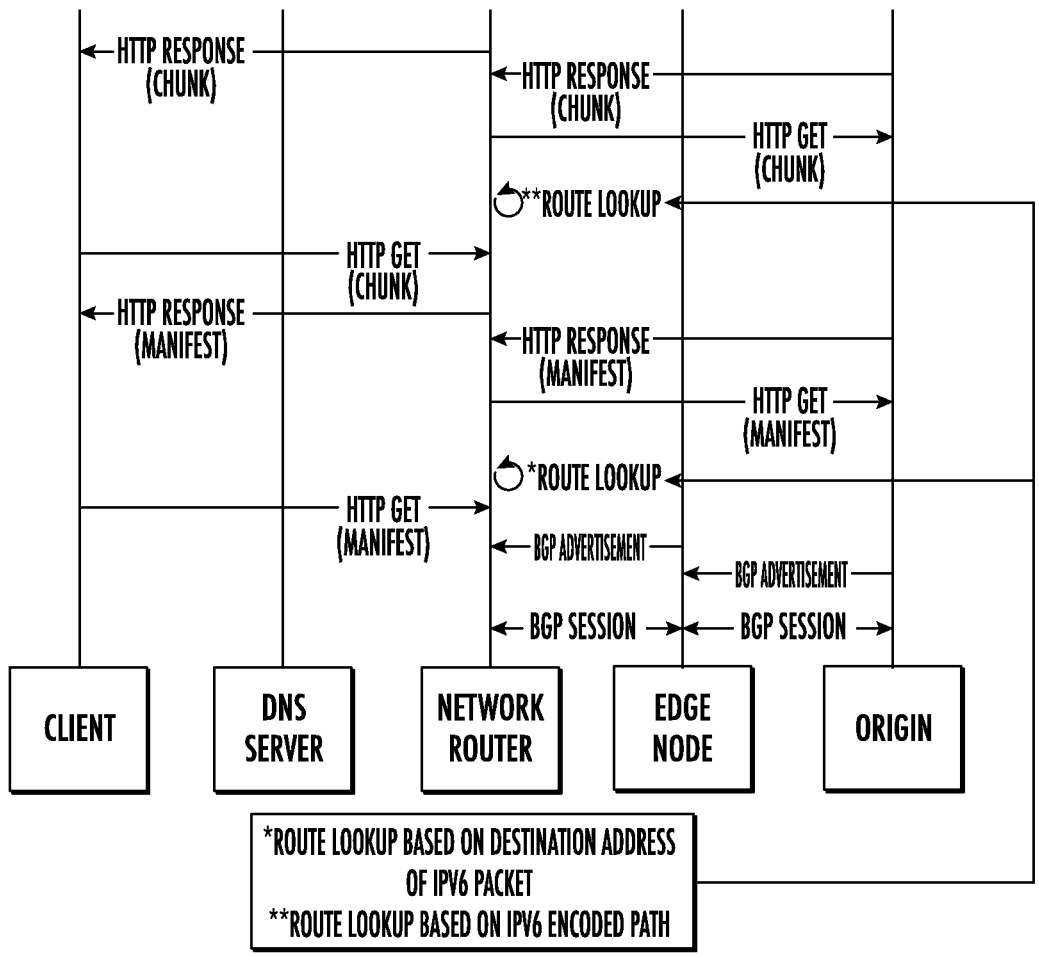
FIG. 5b is a ladder diagram illustrating one embodiment of a hybrid model architecture call flow according to the present disclosure.

FIGS. 5a and 5b illustrate a hybrid approach according to another embodiment, involving elements of the foregoing approaches of FIGS. 3a-3b and 4a-4b. Regarding HTTP persistence, in the instance where the literal hostname IPv6 address is the URL referencing the (content) manifest file, and the manifest contained IPv6-encoded content "chunk" names, the client may continue to use the literal hostname for its TCP connection (thereby maintaining HTTP persistence), and using relative URLs using that hostname for the subsequent chunks obtained. As all requests for those chunks would be routed to the same server, affinity exists in this approach as well.

Multi-Tier CDN—

Figure 6:
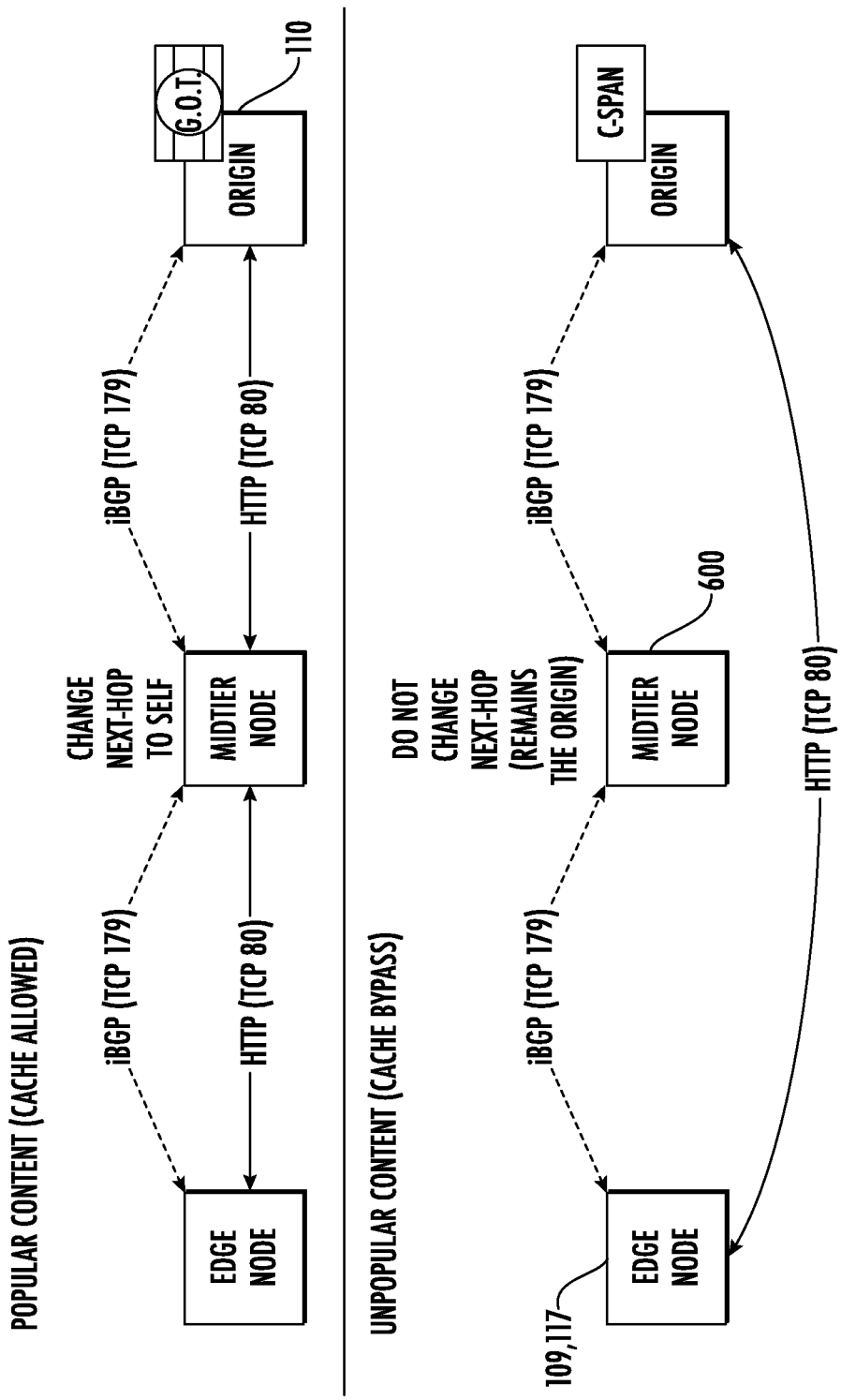
FIG. 6 is a logical block diagram illustrating one embodiment of a cache tiering architecture according to the present disclosure.

Thus far, all examples have been based on a single-tier CDN with a caching edge node 109, 117 backfilling directly from an origin (or set of origins). Adding tiers to the CDN can, but does not have to, change the mechanisms previously described. As shown in FIG. 6, a mid-tier cache 600 can in one embodiment be configured to operate as a route-reflecting tier, re-advertising origin-learned routes to the edge node. Alternatively, in another approach, the inserted tier can be configured to include logic that enables "intelligent" re-advertisement of routes where appropriate. This "cache scoping" can provide increased efficiency as tiers can choose to allocate caching resources based on one or more metrics, such as resource popularity. This functionality can be implemented for example by choosing to change the next-hop in the BGP route to itself (ostensibly a "popular" resource) as shown in the top portion of FIG. 6, or other ("unpopular" resource) as shown in the bottom portion of FIG. 6. Not changing the next-hop will leave the origin 110 as the next-hop, causing the edge node to skip the mid-tier(s), and proceed directly to the origin, preventing cache pollution on the mid-tier.

Whether or not the resource be "cache allowed" or "bypassed" may be identified by the upstream device (the origin 110 in this case), as it alone will typically know how many requests are being made for a given asset. How this is communicated is discussed in the following section detailing use of communities.

BGP Communities—

One of the characteristics of BGP that makes it an appealing option for a CDN control protocol is that it can carry arbitrary information, which is opaque to the protocol, such as in the form of "BGP communities." BGP communities are typically embodied as locally significant, numeric strings (which come in the form of IPv4-type strings or [integer]:[integer] strings, both are acceptable) generally used as informational only (e.g., "This route is from New York") or for route-policy enforcement (e.g., "This route can be advertised to customers"). There are multiple "well-known" communities, which standards-compliant routers honor, see Table 1 below:

TABLE 1

| Community | Well-known Name | Functionality |
| --- | --- | --- |
| 65535:65281 | NO_EXPORT | Do not advertise this route to any eBGP peer |
| 65535:65282 | NO_ADVERTISE | Do not advertise this route to any peer (iBGP or eBGP) |
| 65535:65283 | NO_EXPORT_SUBCONFED | Routes are not advertised outside of the local AS (even if it is a confederated AS) |

These communities are designed to control route propagation, and can certainly be used for their native purposes consistent with the apparatus and method of the present disclosure. Moreover, with BGP as part of the control plane for intra- or inter-CDN communication, other use cases for communities will be recognized, including those discussed infra with respect to Table 2 (a non-exhaustive list of exemplars).

TABLE 2

| Community | Well-known Name | Functionality |
|---|---|---|
| 64000:X | — | Storage Control |
| 64000:1 | RR_FLUSH | Flush resource from cache |
| 64000:2 | RR_NO_CACHE | Serve, but do not cache, resource |
| 64000:3 | RR_BLOCK | Respond to any request with an "X" HTTP code |
| 64100:X | — | Upstream Control |
| 64100:1 | RR_RETAIN_NH | Retain the next-hop of advertising peer (iBGP only) |
| 64100:2 | RR_SET_NH | Direct the receiver to set the next-hop of the route to the value provided in the AGGREGATOR attribute (iBGP only) |
| 6420X:X | — | Bandwidth Representation |
| 64200:X | RR_TRAFFIC_Mb | Representation of traffic load asset generates (Mb/s) |
| 64201:X | RR_TRAFFIC_Gb | Representation of traffic load asset generates (Gb/s) |
| 64300:X | — | Popularity Representation |
| 64300:1 | RR_POPULAR | Origin expects resource to be popular, receiving CDN MAY choose to pre-fetch (or decrease/eliminate required hit count to cache) |
| 64300:2 | RR_UNPOPULAR | Origin expects resource to be unpopular, receiving CDN MAY choose to not cache (or increase required hit count to cache) |
| 64300:3 | RR_PREFETCH | Origin requests pre-fetching of resource |
| 64301:X | RR_HIT_COUNT | Origin recommended hit count to cache |
| 64400:X | — | Serving Control |
| 64400:1 | RR_HTTP_REQ | Origin requires content be served only over HTTP connections |
| 64400:2 | RR_HTTP_PREF | Origin prefers content be served only over HTTP connections |
| 64400:3 | RR_HTTPS_REQ | Origin requires content be served only over HTTPS connections |
| 64400:4 | RR_HTTPS_PREF | Origin prefers content be served only over HTTPS connections |

Inter-CDN Control Plane—

Figure 7:
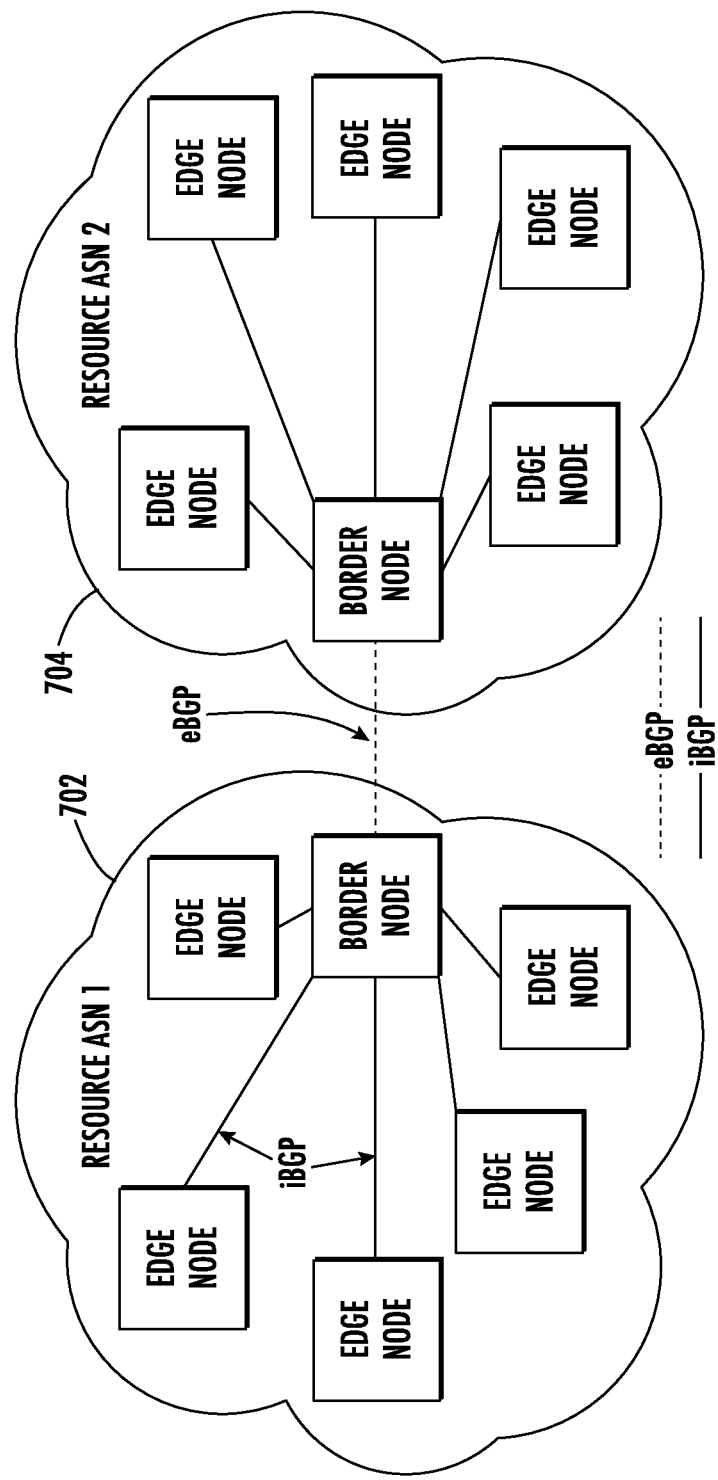
FIG. 7 is a logical block diagram illustrating one embodiment of a eBGP resource peering architecture according to the present disclosure.

One of the highly advantageous aspects of the more granular RR as discussed supra is that such approach can provide a common, well-understood control plane for communicating resource "reachability" between different serving entities. In such models (see example of FIG. 7), CDN's 702, 704 in effect appear as discreet autonomous systems and "resource peers" with other resource Autonomous System Numbers (ASNs), generally comparable to the way in which IP ASNs peer with each other to advertise IP reachability information. The basic principles in which these resource ASNs interoperate largely mirrors traditional IP peering. In one exemplary implementation, resource nodes "peer" with one another via eBGP (external BGP) interfaces, and advertise reachability to resources represented by IPv6 prefixes. The semantics of these advertisements may take on any number of forms (including those based on e.g., business considerations); however, the prefixes allowed over these peering points, and their specificity, do impact the functionality across the peer's CDN, as described in greater detail subsequently herein.

Accordingly, in one approach, RR prefixes are used for inter-CDN communications; in one implementation, such prefixes are registrar-allocated blocks assigned to resource ASNs to represent aggregate sets of resources. An example might be an MSO being allocated 2605:1234::/32; this means that all resources allocated an IPv6 address within that particular MSO would be numbered out of this subnet.

Peering Relationships—

Like IP(v6) reachability peering, resource peering entities may have different business relationships, offering different capabilities with different commercial settlements. Various embodiments of such peering relationships consistent with the present disclosure are now described.

Figure 8:
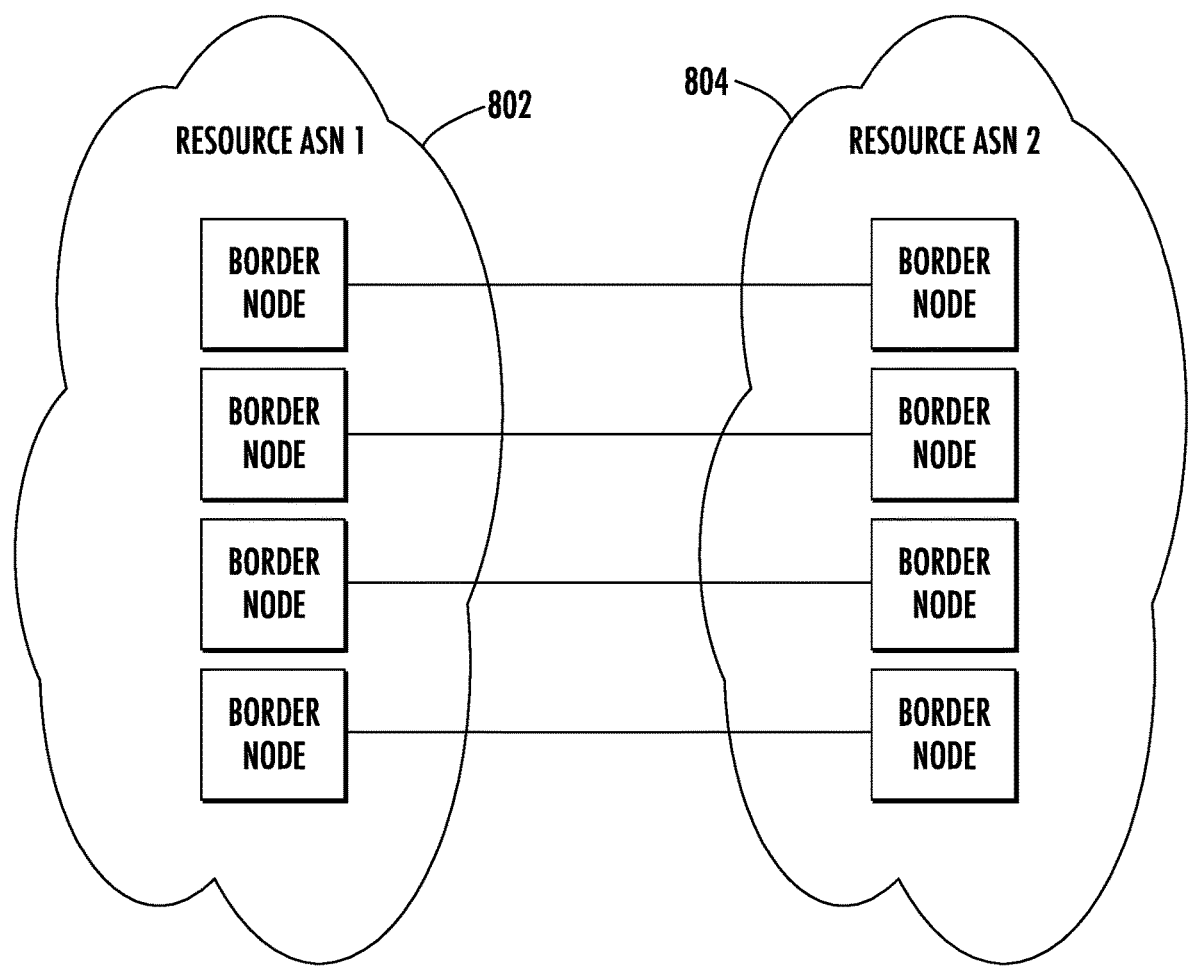
FIG. 8 is a logical block diagram illustrating an exemplary settlement-free peering expense structure.

One basic form of resource peering is settlement-free peering, in which neither entity pays the other for access to one another's reachability information. This type of peering may be used for example between large entities that each benefit from the relationship approximately equally. Under a settlement-free agreement (FIG. 8), ASN1 802 would pay for the first peering point, ASN2 804 would pay for the second one, and so on.

Figure 9:
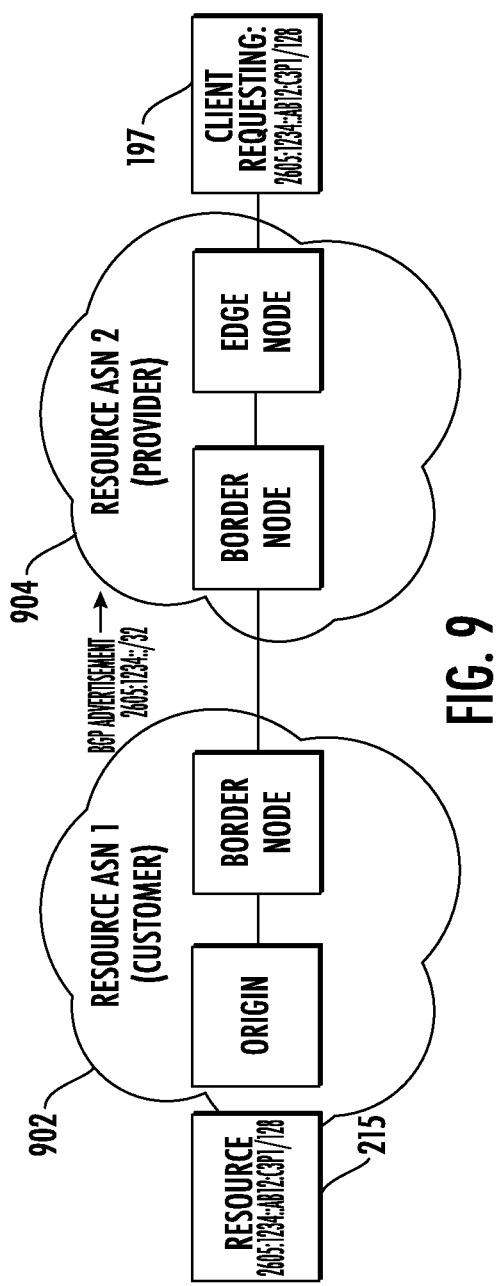
FIG. 9 is a logical block diagram illustrating one embodiment of foreign caching peering architecture according to the present disclosure.

In foreign caching (FIG. 9), a resource source advertises resource reachability. In the context of IP routing, reachability information is exposed to the peer's network. In this mode, the "customer" resource ASN 902 would advertise their resource prefix(es) to the provider resource ASN 904. The provider ASN would then have access to those resources and could use that routing information to backfill the resource. This allows the provider ASN to cache and serve resource on its edges. The main goal of foreign caching is placing the resource closer to the consumer, improving the customer experience.

Figure 10:
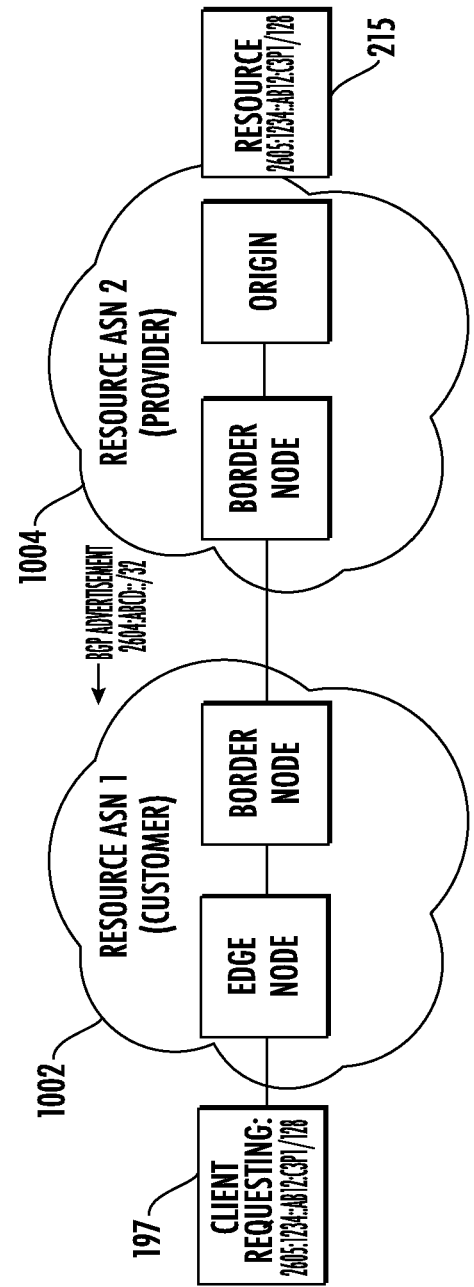
FIG. 10 is a logical block diagram illustrating one embodiment of local caching peering architecture according to the present disclosure.

Conversely, in local caching (FIG. 10), effectively the opposite approach from foreign caching is utilized, in that rather than advertising resource routes to other resource ASNs, those resource ASNs (providers) 1004 advertise resource routes to the local ASN (customer) 1002. This allows the local ASN 1002 to backfill and cache resource from the provider 1004, with the intention of reducing IP peering bandwidth. This generally aligns with a transit IP peering relationship.

Figure 11:
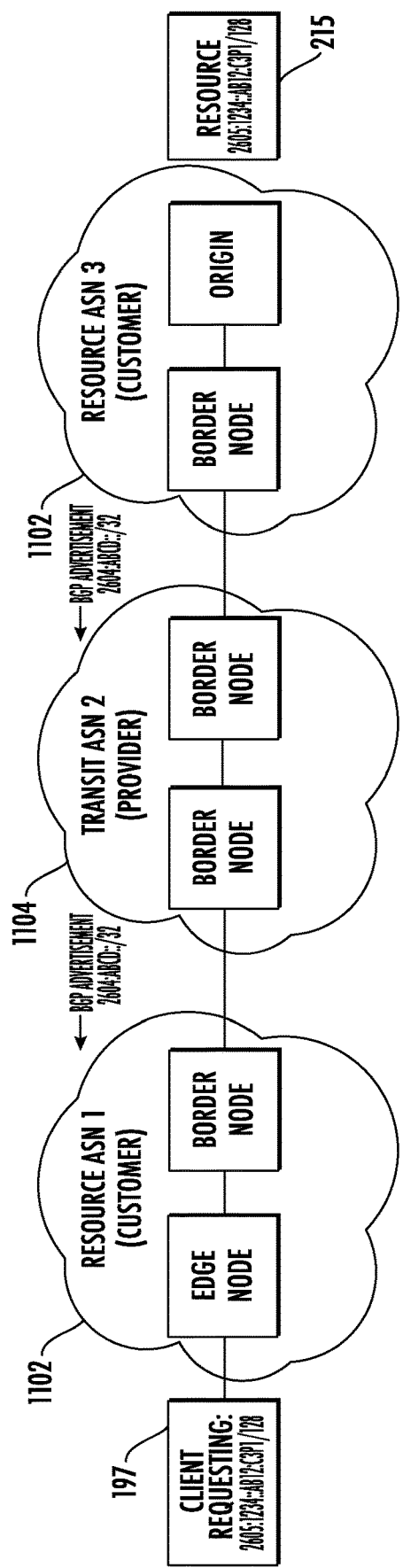
FIG. 11 is a logical block diagram illustrating one embodiment of transit caching peering architecture according to the present disclosure.

Transit caching (FIG. 11) provides a mechanism for a CDN to provide caching transit between sources and requesters. In this case, neither the client 197, nor the resource 215 is on the transit providers network 1104, but the provider is making its caching infrastructure available to the source of the resource and is making that resource available to network of the client. This is simply a second eBGP connection, allowing the client's network's CDN 1102 to backfill from the transit providers network 1104.

Customer Steering—

One additional consideration relating to RR implementation is that "customers" of resources/content must be steered towards the correct edge node of the correct CDN in order to obtain the desired resource. Having the resource cached is ineffective and inefficient if the cached resource is not used. Accordingly, two exemplary options to address this requirement are now described in detail.

1. Geo-Location Aware DNS—

In a first approach (see FIG. 12), DNS-based CDN steering (comparable to that commonly employed in prior art CDNs) can be used. The basic premise of this approach is that the DNS lookup for a CDN hostname is provided to an "intelligent" DNS server 1210, which includes logic to determine the client's location (such as for example using an IP-to-geographic location mapping tool or service), as well as the locations and status(es) of the relevant edge nodes 109, 117. The DNS server 1210 identifies the appropriate edge node, and responds to the DNS request with the corresponding IP address. Once the request is within the CDN, the above processing can occur to fulfill the request.

Figure 12A:
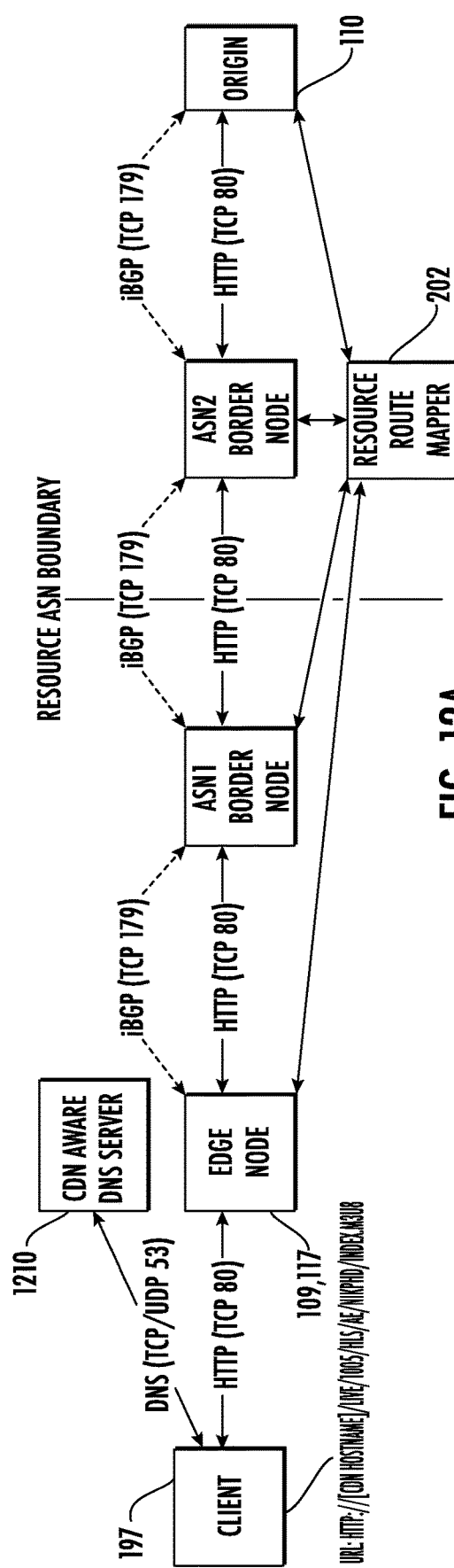
FIG. 12*a* is a logical block diagram illustrating one embodiment of geographic location-aware DNS client routing architecture according to the present disclosure.

As shown in FIG. 12b, the various nodes (edge, ASN1, ASN2) issue mapping requests to the resource route mapping process 202, and perform route lookup based on IPv6 addresses returned by the mapper 202.

Figure 13A:
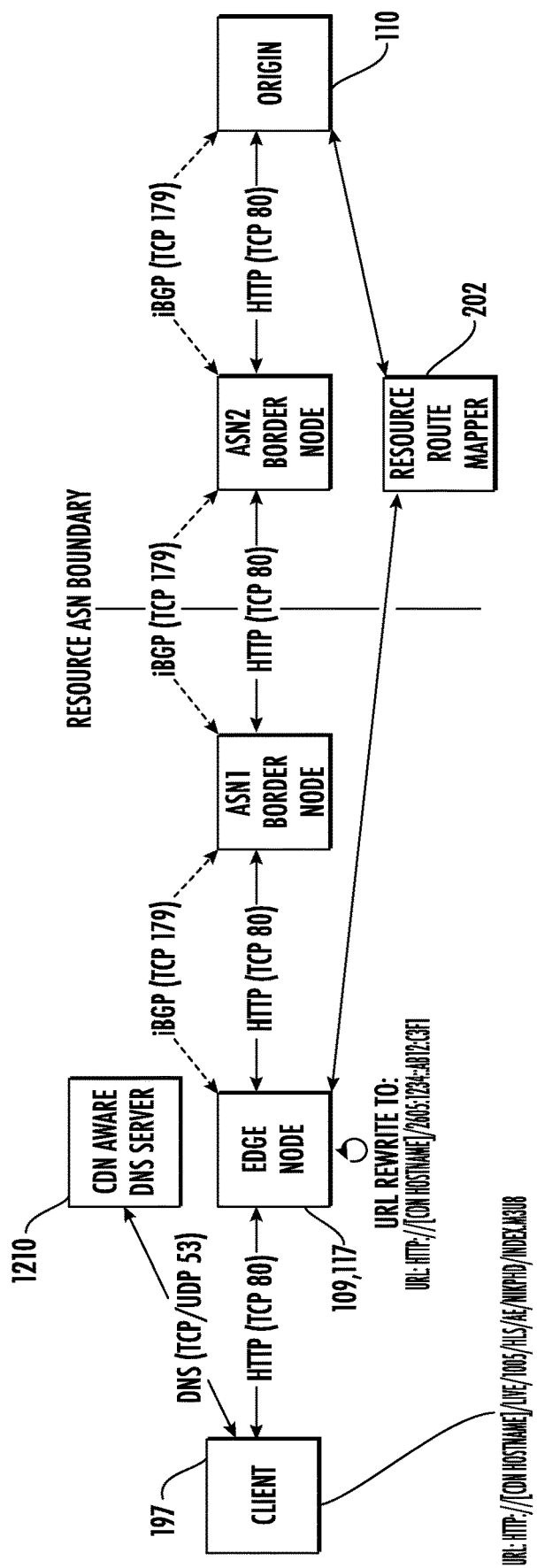
FIG. 13*a* is a logical block diagram illustrating one embodiment of geographic location-aware DNS client routing architecture with edge node HTTP GET rewrite functionality, according to the present disclosure.
Figure 13B:
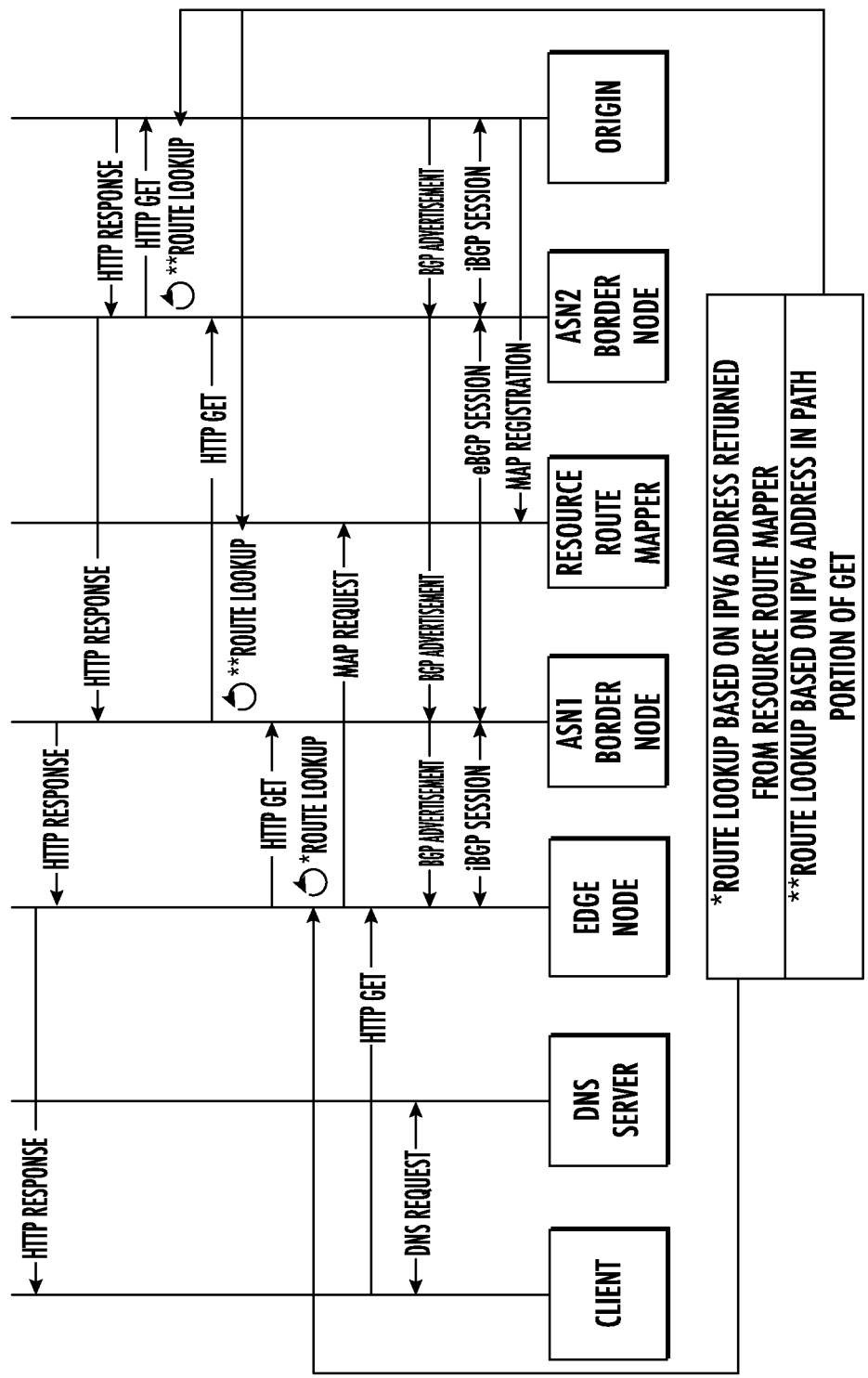
FIG. 13*b* is a ladder diagram illustrating one embodiment of message flow for the geographic location-aware DNS client routing with edge node HTTP GET re-write functionality of FIG. 13*a*.

As an alternative to each node performing a map request against the resource route mapper 202 as in FIG. 12b, the first node (e.g., the edge node 109, 117) may change or rewrite the path portion of the HTTP GET request to the literal IPv6 address returned from the mapper process, as shown in FIGS. 13a and 13b. This advantageously allows subsequent CDN nodes to simply perform a route lookup on the IPv6 request provided in the path, but does require that the edge node maintain mapping "state" or status between the original request and the rewritten request, and also that the origin to be able to reverse-map the IPv6 address back to the expanded path. Notably, similar logic implementing a "reverse lookup" can be utilized on the edge node 109, 117, thereby removing the need to maintain state.

2. Edge Route Leaking—

Figure 14A:
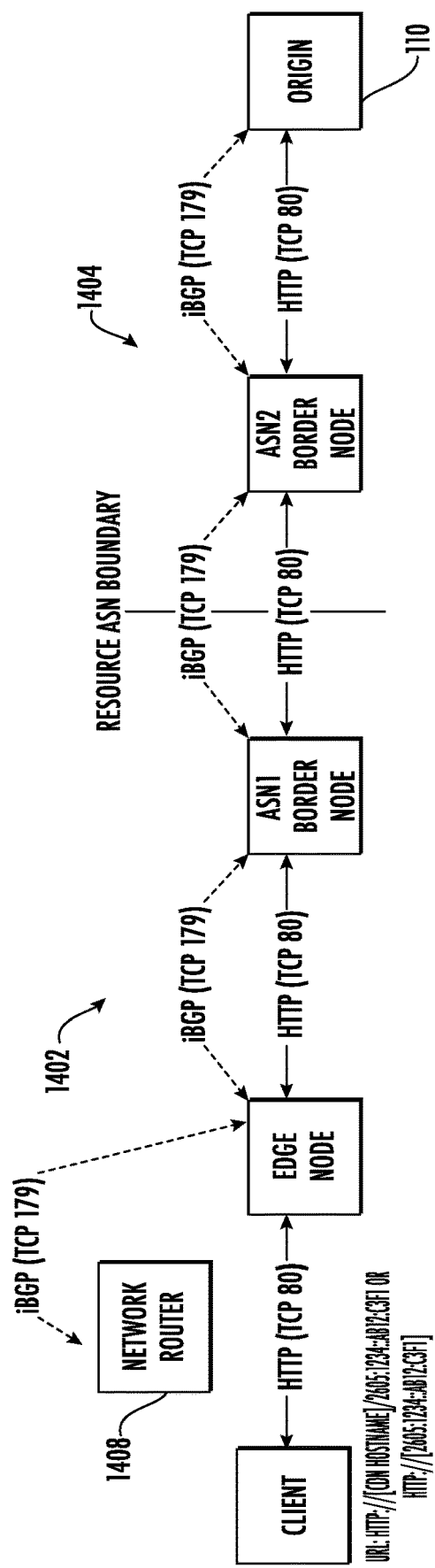
FIG. 14*a* is a logical block diagram illustrating one embodiment of a route "leaking" client routing architecture according to the present disclosure.
Figure 14B:
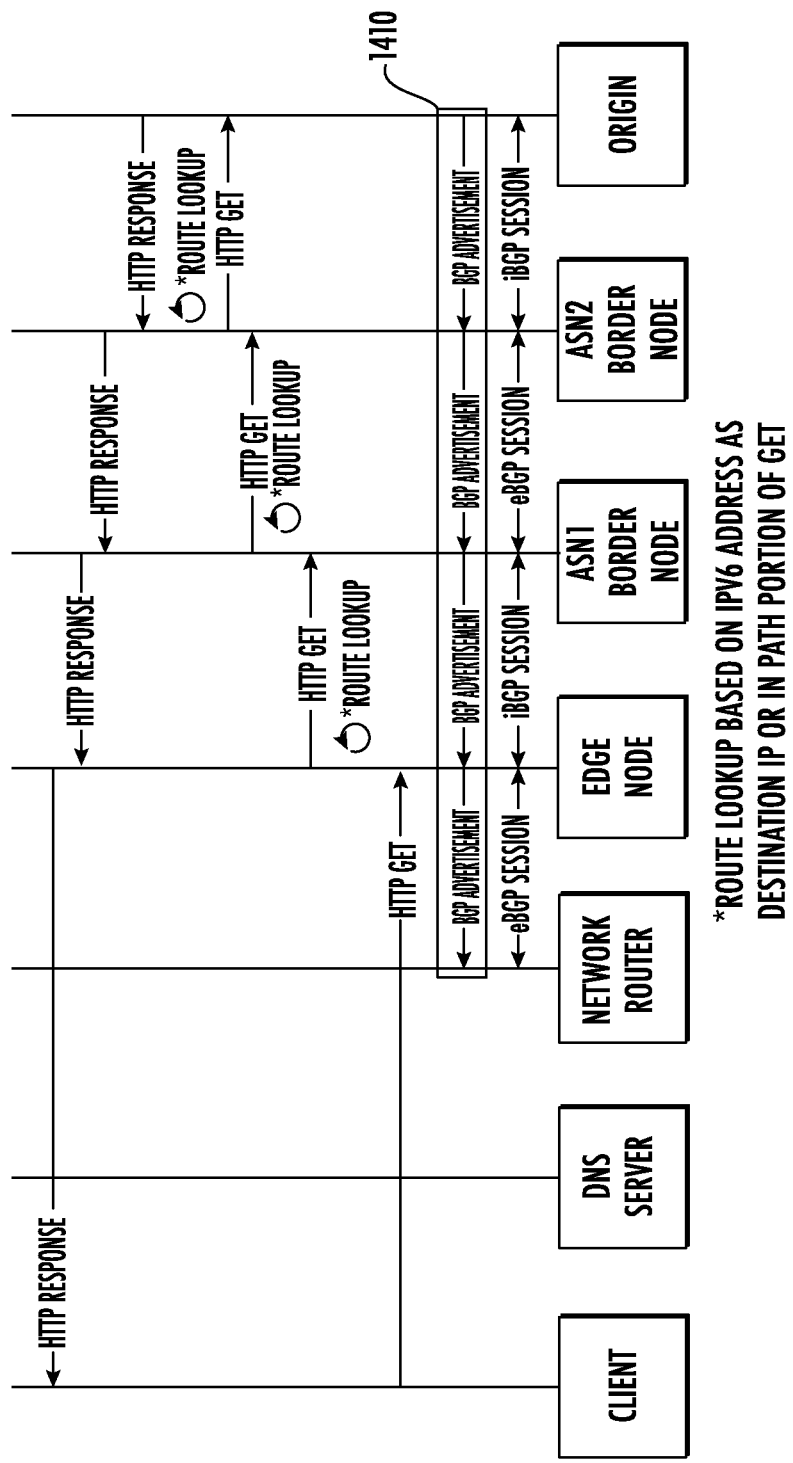
FIG. 14*b* is a ladder diagram illustrating one embodiment of route "leaking" client routing message flow according to the present disclosure.

A second solution to the customer steering problem (see FIGS. 14a and 14b) is to allow edge nodes on a peer CDN 1404 to advertise RR information to the (other) peer network 1402 (or vice versa) as shown via the various inter-node advertisements 1410. This model has two features: (i) direct resource naming, as previously described herein; and (ii) IPv6-only (unless there is a client fallback to IPv4 as previously described, which does however preclude client-to-edge affinity). Direct resource naming is utilized to allow the client 197 to make the HTTP request to the explicitly defined IPv6 address. The latter is a consequence of the first, as IPv6 must be fully supported to forward IPv6 packets. No route mapper 202 is utilized in this configuration; however, a network router 1408 is utilized in association with, inter alia, the edge node 109, 117.

It is important to note that the leaking network must be carefully configured in scenarios where the resource routes are exposed to the IP network, as any leaking node may field direct client requests. For example, if a mid-tier node (see e.g., the node 600 in FIG. 6) inadvertently leaks resource routes, it may see direct client requests, circumventing edge nodes. It is possible that this is desirable in certain situations, but the impact of route-leaking should always be critically evaluated in such configurations to ensure that undesired behaviors are avoided.

Moreover, receiving networks cannot advertise received resource routes to other IP network (classic IP peering), unless that functionality is specifically requested/negotiated.

Route Aggregation and De-Aggregation—

As occurs in extant IP peering, aggregation and de-aggregation are at odds with each other; i.e., functionality battles scalability. Aggregation is the practice of summarizing multiple routes into a single larger announcement, and is generally looked upon as "good" as it limits the size of the Internet routing table, while de-aggregation (the practice of advertising multiple specific routes when an aggregate could be announced) has the opposite connotation. As of this disclosure, the IPv4 Internet routing table is approximately 685,000 routes; approximately 307,000 of these routes could be aggregated, which represents an 81% table size increase as a result of de-aggregation. IPv6 only exacerbates this problem, as there are $2^{96}$ times the number of possible prefixes (i.e., approx. 339,302,416,384,000,000,000,000, 000,000,000,000,000).

There are many reasons that service providers de-aggregate. Security is a commonly used argument (i.e., to protect against subnet hijacking). The logic in this case is that to protect against another, unauthorized party from advertising ones address block, the true owner will simply advertise the smallest allowable subnets of that block, and as the most specific route always wins by default, they have "secured" their origination of that routing information.

Figure 15:
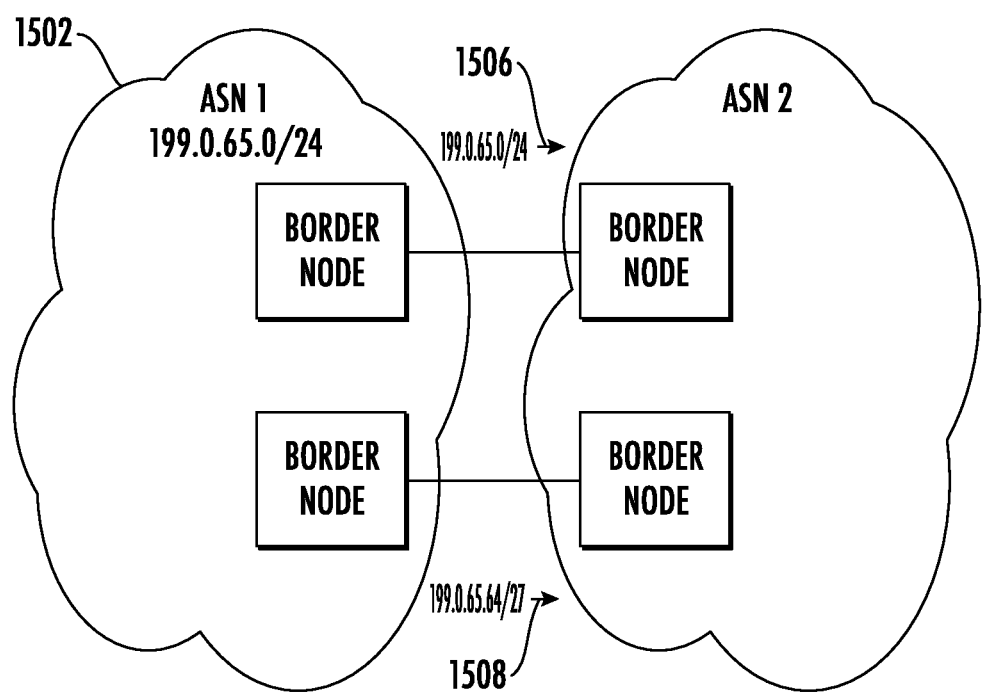
FIG. 15 is a logical block diagram illustrating one typical approach to IP de-aggregation according to the prior art.

Alternatively, de-aggregation may be used as a form of traffic-engineering; again, more specific routes are always preferred by default. As an example, consider FIG. 15, wherein ASN1 1502 is advertising its /24 over the top peering session 1506, and a specific instance out of that address block, 199.0.65.64/27, over the bottom session 1508. The result of this configuration is that any traffic destined to 199.0.65.64/27 (199.0.65.64-199.0.65.95) will traverse the bottom connection 1508, while traffic destined to anything else in that /24 (199.0.65.0-199.0.65.63 and 199.0.65.96-199.0.65.255) will utilize the top session 1506. While there are benefits to this approach, it can very quickly lead to issues including so-called routing table "bloat."

Figure 16:
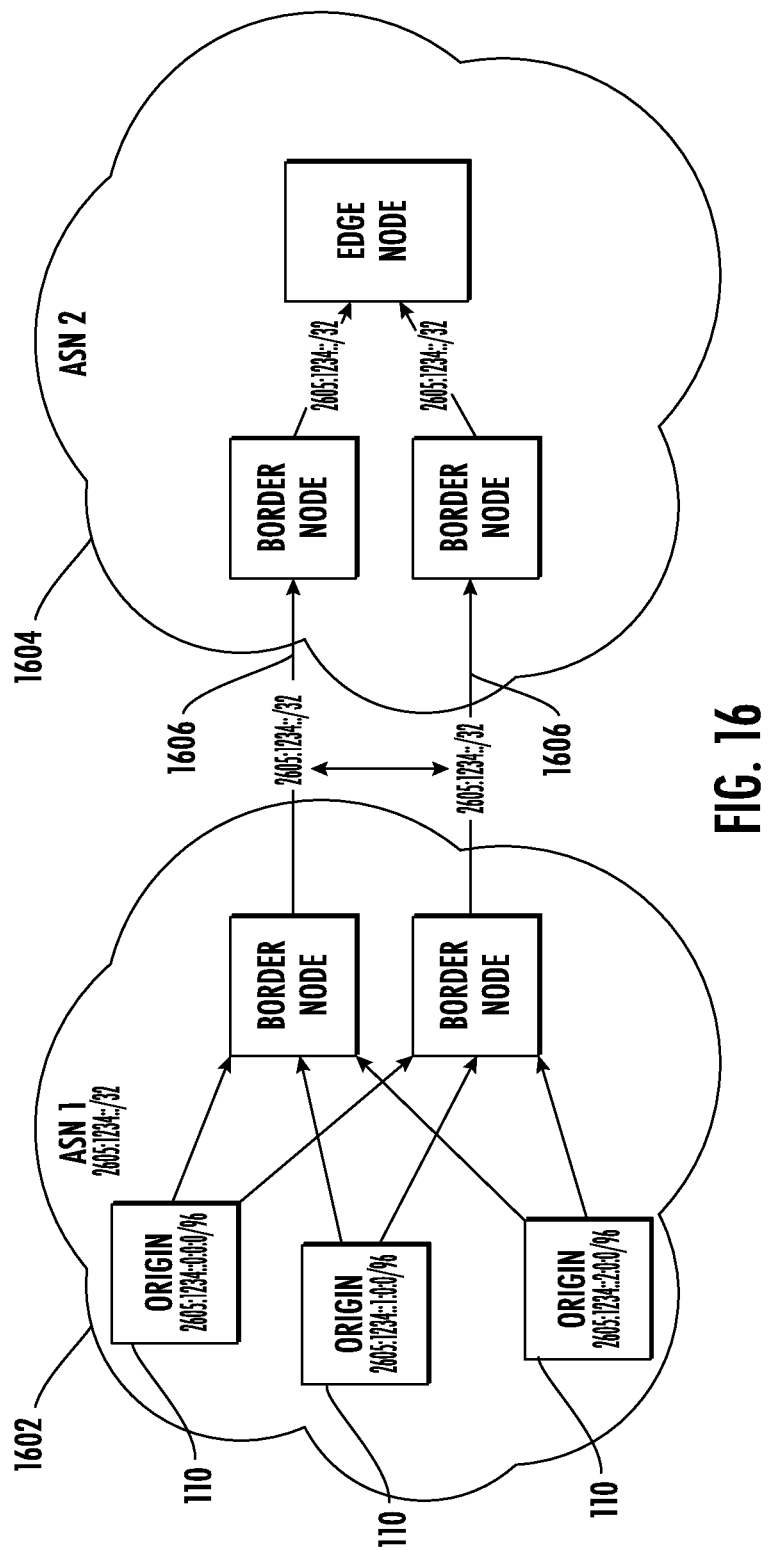
FIG. 16 is a logical block diagram illustrating one embodiment of resource prefix aggregation architecture according to the present disclosure.

Accordingly, in one exemplary embodiment (see FIGS. 16a and 16b), the RR entities described herein advertise their allocated aggregate routes to RR peers, keeping specific routes internal to their ASN (e.g., ASN1 1602 in FIG. 16). As shown therein, resource ASN1 1602 having 2605: 1234::/32, with three specific /96's originating from separate origin servers 110. Despite these specifics, ASN1 1602 is only advertising a single /32 1606 representing those /96s to ASN2 1604. ASN2 does not need the specifics, and can use the /32 to forward all requests to ASN1, which then has the specific /96s to route the request to the proper origin 110.

Figure 17:
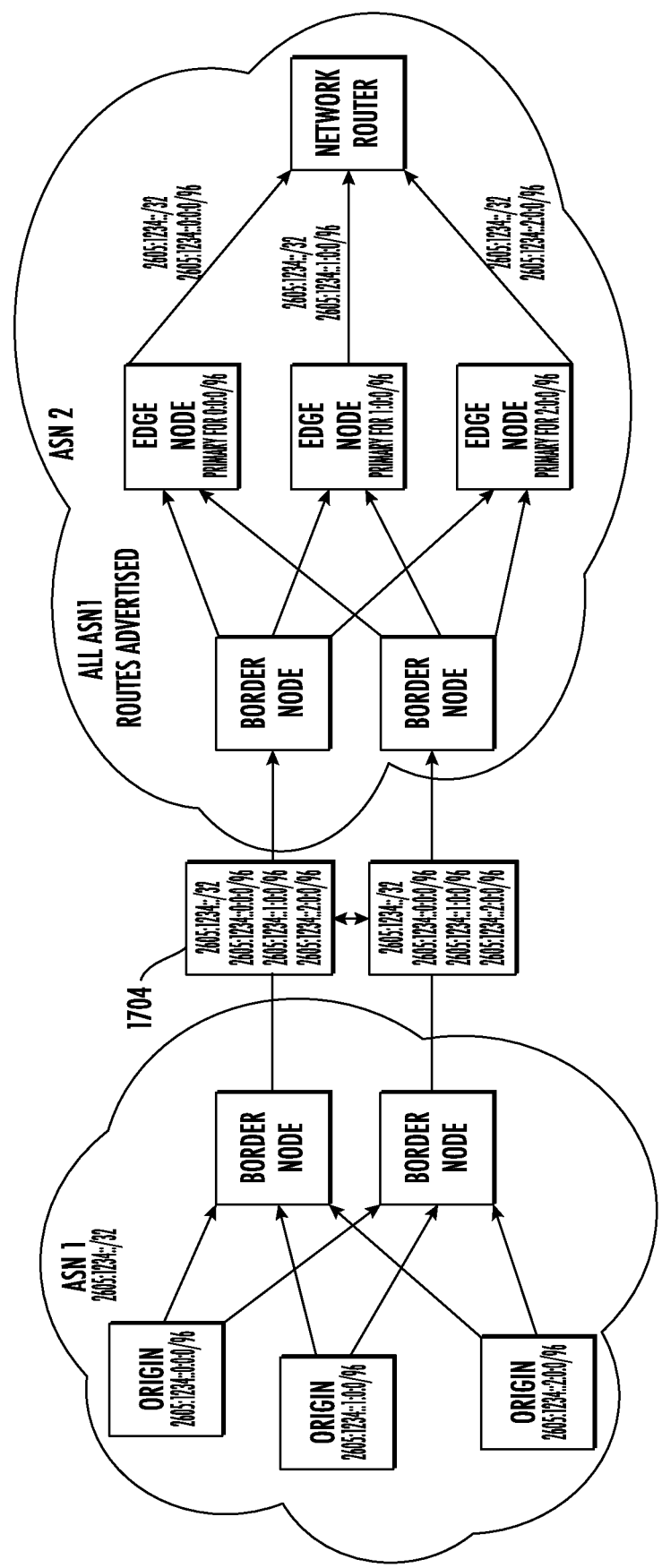
FIG. 17 is a logical block diagram illustrating one embodiment of an architecture configured for de-aggregation for affinity according to the present disclosure.

As described above, aggregation is often good for routing ecosystems, but there are also use cases in which some degree of de-aggregation is desirable and/or required. A representative use case is found within examination of client-to-edge affinity within the aforementioned route-leaking scenario. In this model, the peer network's edges will "leak" the customer ASN's routes to the IP network unless particular measures are taken to avoid it. In the aggregated situation described above, each peer network edge would advertise the same /32 representing ASN1's prefix, making all routes equal, and thereby allowing any request to reach any edge (and precluding affinity, or the routing of similar requests to similar nodes). Given this, allowing some de-aggregation of addresses 1704 as shown in FIG. 17 permits the peer ASN to advertise specifics with varying degrees of preference or selectivity from each particular edge node, and as prefixes represent particular resources, pinning a given prefix to a given node provides client-to-edge affinity. In one exemplary implementation, an upper boundary of specificity is applied to eBGP sessions supporting this arrangement, so as to limit the routing table pollution caused by this approach. This limit may also be dynamically varied (such as via a controller entity or process, such as within the manager entity 171 of FIG. 1).

Figure 18:
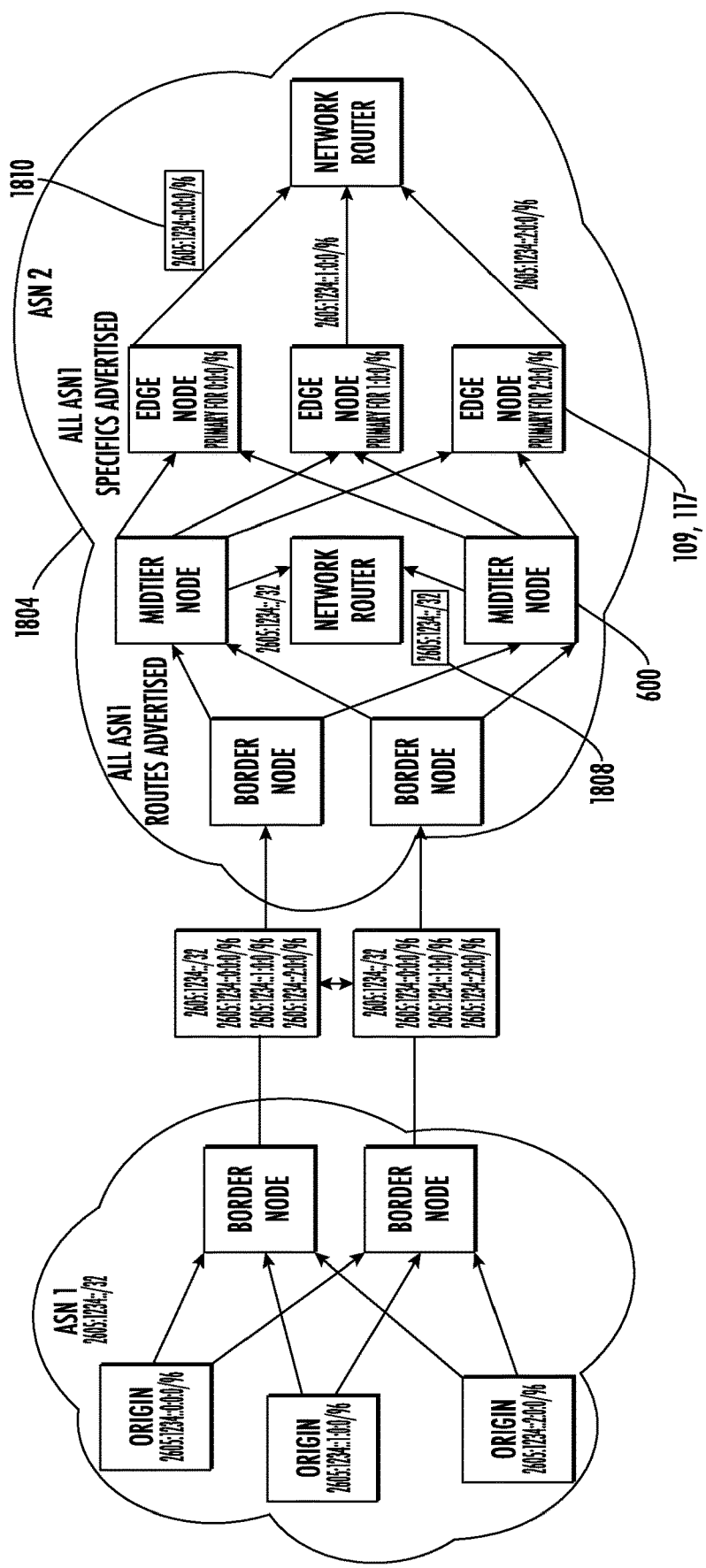
FIG. 18 is a logical block diagram illustrating one embodiment of an architecture configured for de-aggregation for affinity (e.g., in a "northbound" failover scenario) according to the present disclosure.
Figure 19A:
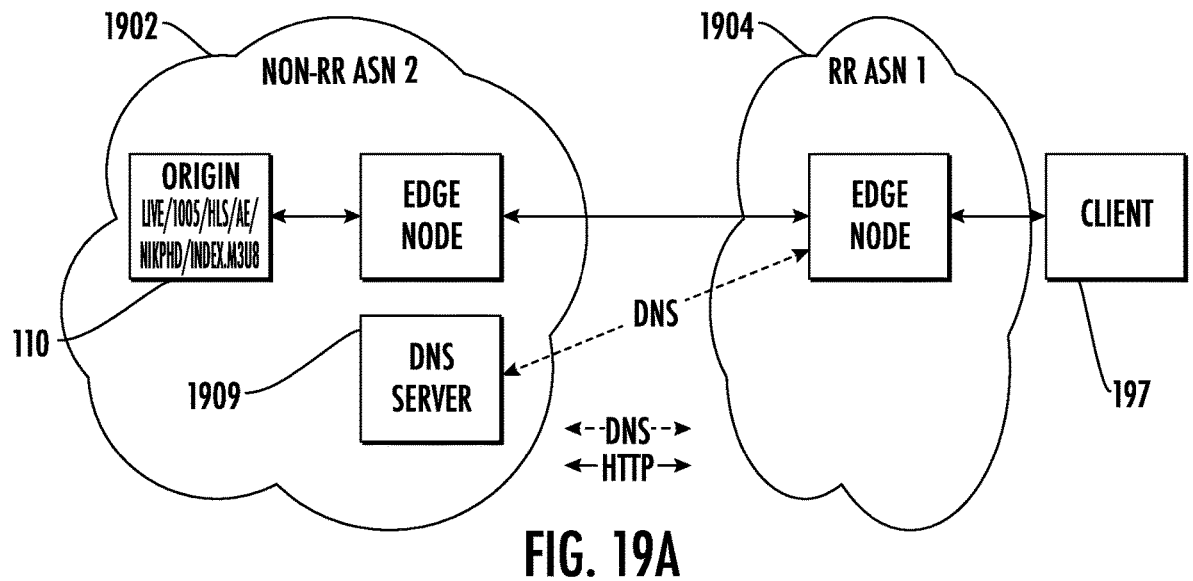
FIG. 19*a* is a logical block diagram illustrating one embodiment of non-RR enabled CDN (source) to RR-enabled CDN (client) DNS-based architecture according to the present disclosure.
Figure 19B:
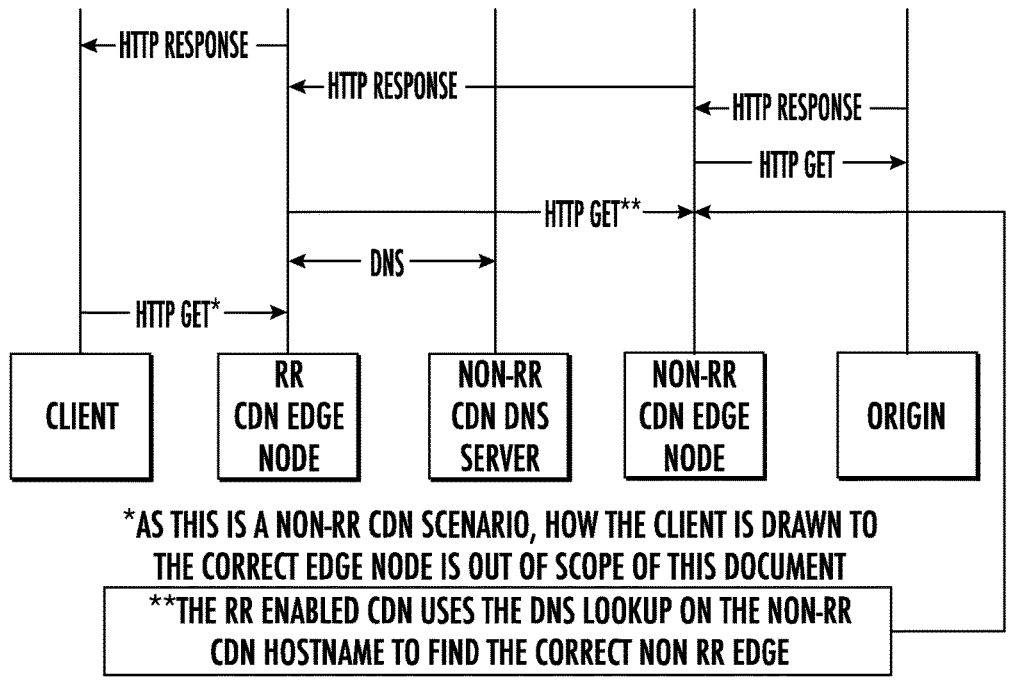
FIG. 19*b* is a ladder diagram illustrating one embodiment of non-RR enabled CDN (source) to RR-enabled CDN (client) DNS-based process flow according to the present disclosure.
Figure 20A:
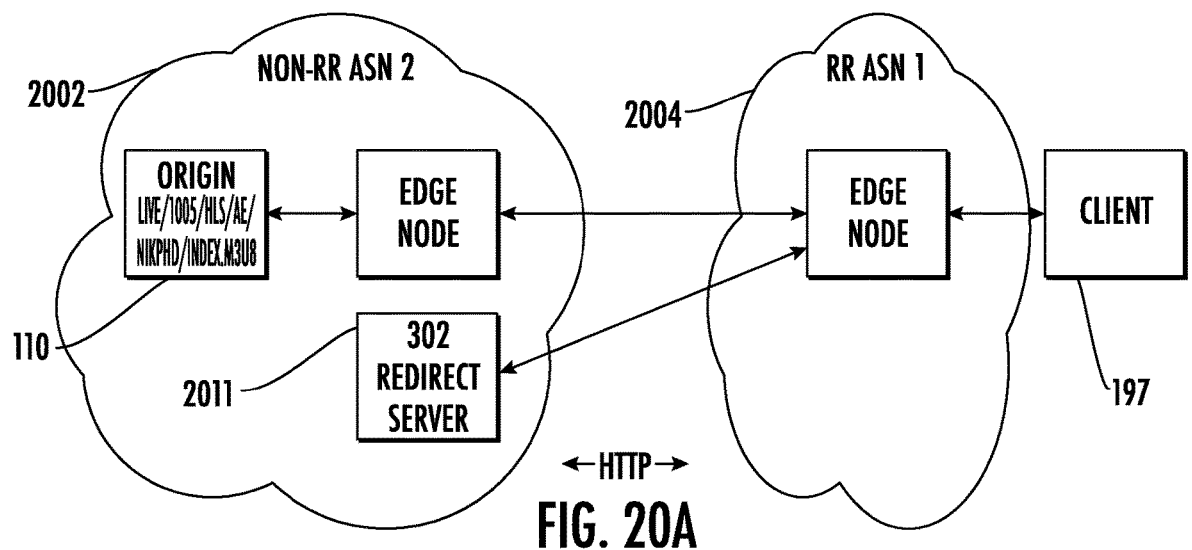
FIG. 20*a* is a logical block diagram illustrating one embodiment of non-RR enabled CDN (source) to RR-enabled CDN (client) HTTP 302-based architecture according to the present disclosure.
Figure 20B:
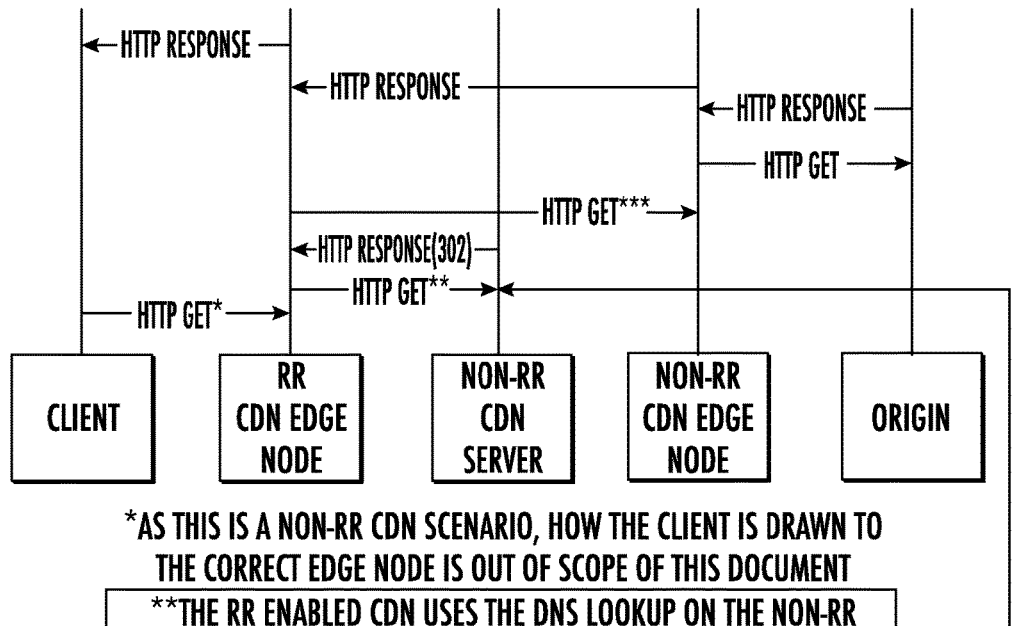
FIG. 20*b* is a ladder diagram illustrating one embodiment of non-RR enabled CDN (source) to RR enabled CDN (client) HTTP 302-based process flow, according to the present disclosure.

It will also be appreciated that the aggregable nature of IP also advantageously allows for a convenient solution to providing a "northbound" backup in the event of an edge device failure or other such condition. As the network logic is configured to select the most specific route by default, a situation in which subsequent tiers of a CDN generate increasingly specific routes can be envisioned. As shown in FIG. 18, the edge nodes 109, 117 of the ASN2 1804 are not advertising the /32 1808, only the /96s 1810 for which they are the primary. The /32 is advertised to the IP network by the newly inserted mid-tier node(s) 600. This configuration allows affinity to the individual edges, with clients 197 failing to the mid-tier nodes 600 in the event of an edge node outage.

Mixed-Mode CDNs—

In another aspect of the disclosure, a hybridized or "mixed mode" resource management architecture is utilized. Specifically, in cases where some CDN operators do not wish to or are unable to utilize an RR-based control plane as described above, an interoperability layer is used to facilitate resource delivery through a mixed or heterogeneous set of CDNs. Two primary scenarios of such mixed CDN use are contemplated: (i) resource(s) originating on a non-RR enabled CDN delivering to an RR-enabled CDN, and (ii) resource(s) originating from a RR-enabled CDN being delivered to a non-RR CDN. Each of these two configurations are now described in greater detail.

1. Non-RR Enabled to RR Enabled—

Referring now to FIGS. 19*a*-19*b* and 20*a*-20*b*, the non-RR enabled CDN 1902 delivering to an RR-enabled CDN 1904 scenario is shown for both DNS-based lookup and HTTP GET-based lookup, respectively. As there will be no resource routing (RR) information originating from the source CDN 1902, 2002 (in that is it not RR-enabled), classical approaches (DNS "trickery" or HTTP 302 redirects via a redirect server 2011) may be used to allow the client side CDN to backfill content from the source CDN 1902. As shown, in one implementation, the RR-enabled CDN 1904 uses the DNS server 1909 associated with the non-RR CDN 1902 for lookup.

2. RR Enabled to Non-RR Enabled—

Figure 21A:
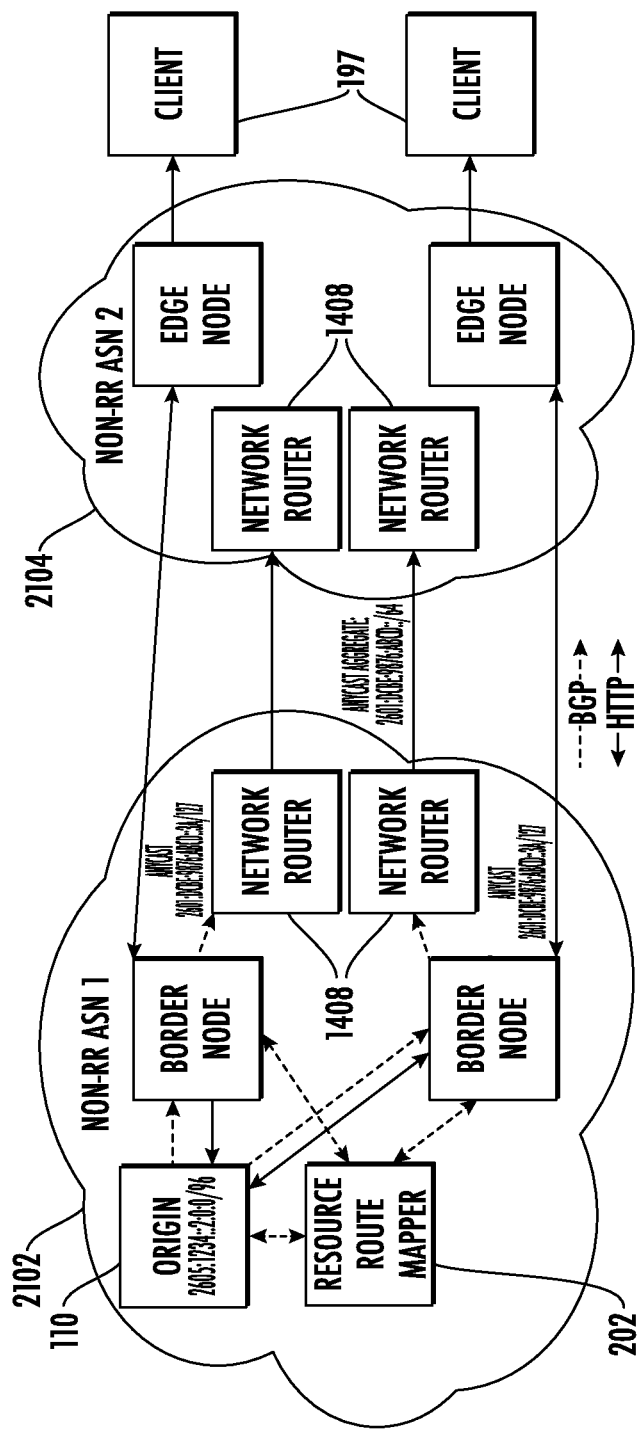
FIG. 21*a* is a logical block diagram illustrating one embodiment of an RR-enabled CDN (source) to non-RR enabled CDN (client) border node architecture according to the present disclosure.
Figure 21B:
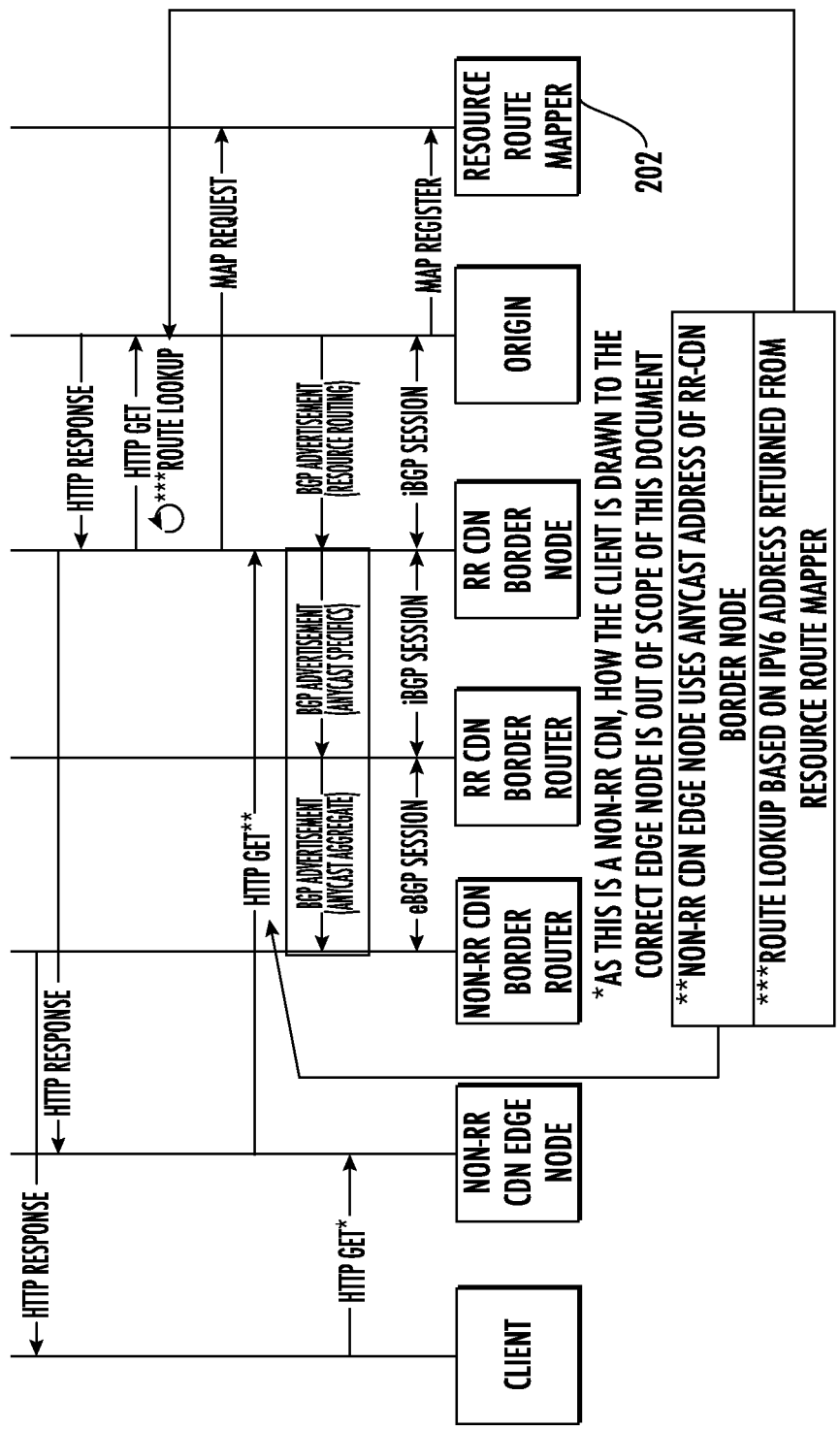
FIG. 21*b* is a ladder diagram illustrating one embodiment of RR enabled CDN (source) to Non-RR enabled CDN (client) border node flow according to the present disclosure.
Figure 22A:
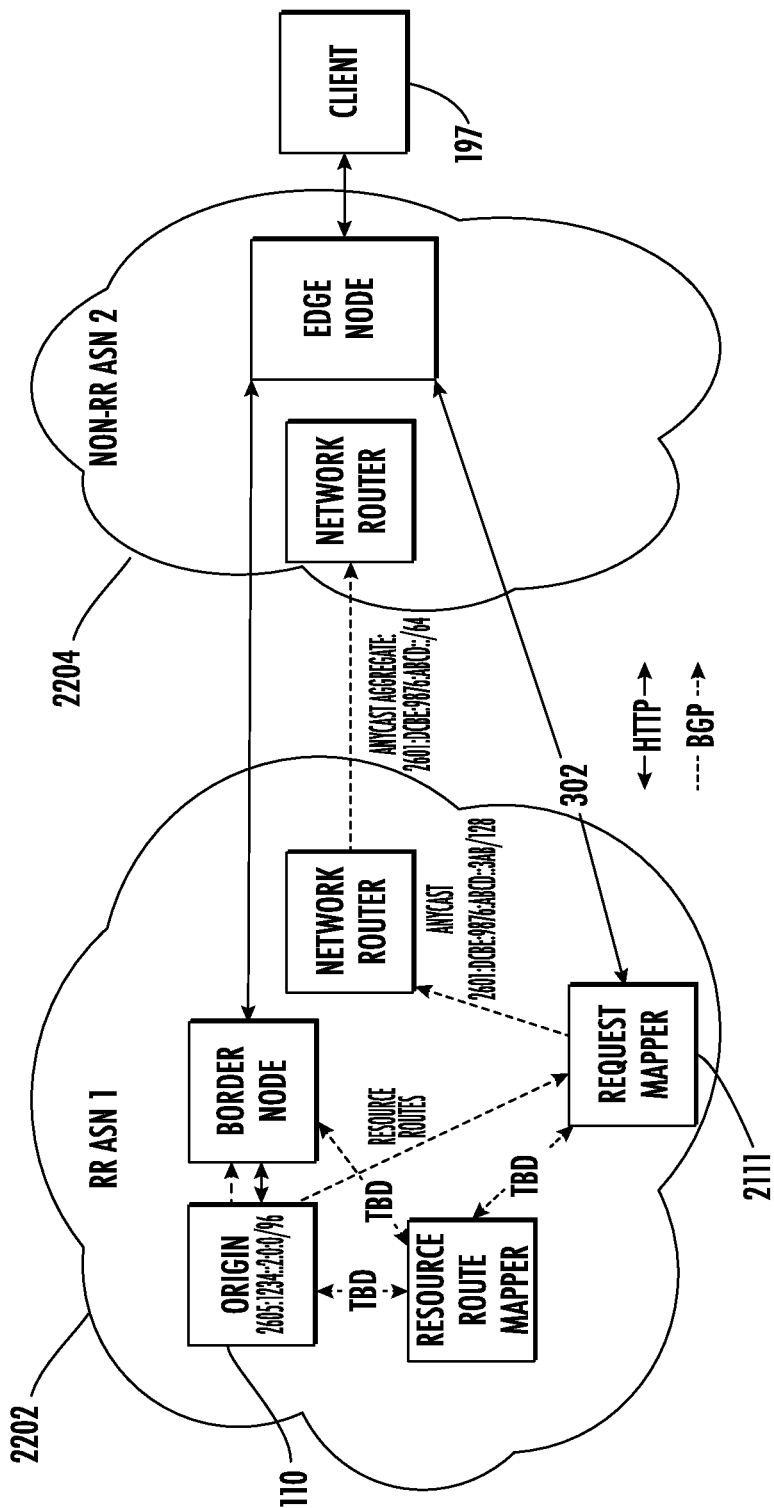
FIG. 22*a* is a logical block diagram illustrating one embodiment of an RR-enabled CDN (source) to non-RR enabled CDN (client) mapping architecture according to the present disclosure.
Figure 22B:
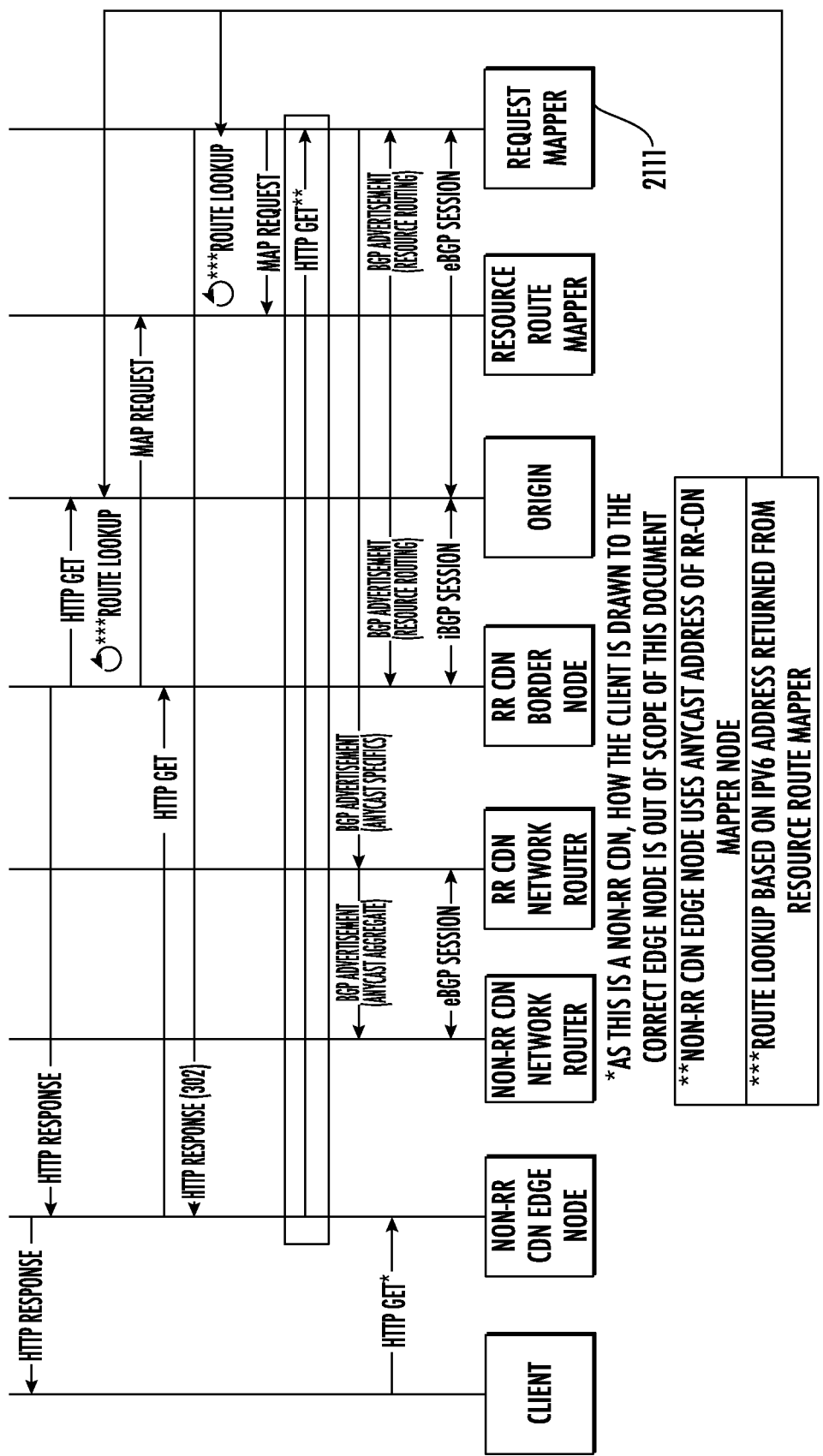
FIG. 22*b* is a ladder diagram illustrating one embodiment of an RR-enabled CDN (source) to non-RR enabled CDN (client) mapping flow according to the present disclosure.

In the second situation (see FIGS. 21*a*-21*b* and 22*a*-22*b*), the clients 197 are on or associated with a non-RR enabled CDN 2104, meaning the client CDN must use a "traditional" approach to finding the right border node of the source (RR enabled) CDN 2102. One exemplary approach to satisfying this requirement utilizes an "anycast" model of the type referenced previously herein for the upstream nodes, configured for the CDN hostname on the client CDN 2104, as shown in FIG. 21*a*. This will cause the client CDN 2104 edge nodes to backfill from an anycast address or set of anycast addresses (see exemplary "anycast" addresses on FIG. 21*a*). Once the request has arrived at the RR-enabled CDN 2102, the normal RR mapping, route-lookup, and request processes as described previously herein can take place.

Rather than have the client (non-RR enabled) CDN 2104 be fulfilled from the border node of the other CDN 2102 as in FIG. 21*a*, in one implementation (see FIGS. 22*a* and 22*b*), a mapping node 2111 is utilized to provide an HTTP redirect to the appropriate border node. In this configuration, the mapping node 211 is only participating in the control plane, in that it would carry the RR table of the source CDN 2102, and utilize that table to perform a route-lookup. However, instead of using the next-hop on the selected route to backfill (as described in the previous option), an HTTP 302 redirect is issued to the upstream node (e.g., edge node of the CDN 2104). This approach allows the source CDN operator to provide mapping nodes, which do not need to be subsequently "built out" to support the demands of the data plane (in that they operate on the control plane only), thereby inter alia, reducing costs.

Origin Namespace—

One consequence of using a multi-tiered caching architecture is that the original hostname used for client-to-edge communication is frequently lost, such as when subsequent requests are made to higher-tier caches within the architecture. In a URL-to-mapping environment, this loss of information precludes the hostname from being included in the mapping algorithm, leaving the URL path as the primary key or entry variable. As there is no guarantee of the uniqueness of a path, path-to-IPv6 mapping collisions will occur, yielding undesirable consequences (e.g., HTTP 404 messages indicative of error (e.g., "not found"), or worse, incorrectly delivered resources). To combat this problem, one implementation of the apparatus described herein uses an "origin namespace" that is created and assigned to content originators. As a matter of convenience and extensibility, addresses allocated out of the registry are assigned resource routing (RR) prefix(es) as the origin namespace. If presented in the HTTP header or as a query parameter, the CDN can propagate that information to other entities/nodes, to ensure that the origin ID+path exists as a globally unique string.

Mapping Agent Identification—

In one embodiment of the disclosure, CDNs are configured to identify which mapping server to request a mapped IPv6 address from using various different approaches. For example, in the use case of a resource routing (RR) enabled CDN resource peering with multiple CDNs, there may be mapping servers for each peer CDN, and a single resource routing CDN may have multiple mappers. However, this requirement must be addressed for non-direct-resource-naming environments, and hence two solutions to this problem are proposed herein. These two approaches, described below, notably may be used independently, or concurrently, depending on the capabilities of the given CDN, and each allows a content originator to utilize multiple mapping entities servicing different segments of their content.

1. Leveraging DNS an a Mapper Identifier—

Based on the origin namespace concept, specifically if represented as an IPv6 address, resource routing (RR) can be used to leverage the extant in.addr.arpa (inverse address) domain. Specifically, the in.addr.arpa domain provides a mechanism for the "reverse" resolution of an IP address to a hostname. Normally, PTR (pointer) records are of interest when performing a reverse lookup, as they map IPs to hostnames; however, the SOA (start of authority) record allows the DNS authority for that prefix space to communicate the appropriate mapping server or process for a given origin ID.

2. Leveraging Unused BGP Route Attributes—

Again, using an IPv6 address as an origin identifier, the BGP routing system can be used to communicate mapping servers. BGP route advertisements (can) carry many attributes referencing IP[v6] addresses. Some of these may not be pertinent to a non-forwarding based BGP infrastructure. In this case, it may be possible to "overload" one of these attributes to convey mapping server information. While having several salient attributes (including being easy to deploy, fast to converge, and precluding external (cached, read: DNS) systems), this mechanism also carries potential risks; e.g., once dedicated to this functionality, the "overloaded" attribute will not be useable for its originally defined functionality. For this reason, in one implementation, a new (e.g., optional) transitive attribute may be defined to carry this information. For instance, the AGGREGATOR (type code 7) attribute may be used to provide a vehicle for this functionality, as there is no expectation of a use case for an AGGREGATOR attribute on a /128 prefix. This advantageously allows a content originator to provide a dynamically updateable (no DNS stickiness) mechanism for directing downstream CDNs to the "best" mapping server for the resource they are requesting.

Exemplary Node Apparatus—

The exemplary embodiments of the anycast CDN described herein may be implemented using general purpose software and/or hardware resources. For example, the software may comprise a Linux operating system (OS) based delivery cache application running a routing daemon (e.g., a Quagga routing suite), a caching daemon, and/or a route manager. The route manager may be configured to advertise and/or withdraw delivery routes based on one or more metrics described herein.

Hardware resources may include for example general-purpose computing hardware. A node may include processing logic (e.g., a processor) configured to execute one or more software modules, a memory to support application execution, storage, and one or more data interfaces. The interfaces include one or more network interfaces for communication to an origin server 110, cache tiers, clients 197, and/or other network entities. The memory may be utilized for storing application data and/or caching content. The storage may be utilized for storing content, routing tables, operation system data (e.g., OS image), and/or other data. The memory in one variant is characterized by lower access time, compared to the storage, the latter which comprises a nonvolatile medium (e.g., magnetic, optical, and/or charge based (e.g., flash), while the memory may comprise a volatile medium (e.g., DRAM, SRAM, and/or other).

In one or more implementations, the node is configured using commercial off-the-shelf computing platform (e.g., Dell PowerEdge server, and/or another apparatus), which advantageously obviates the need for custom or specialized hardware. Hardware and/or software configurations of individual nodes may be set in accordance with requirements of a target application (e.g., content traffic). By way of a non-limiting illustration, a VOD traffic node may be configured to comprise larger storage compared to a node configured to serve linear content. The latter node may include more of faster access memory, as compared to the VOD node. In some implementations, the network has a heterogeneous configuration, wherein the hardware configuration of individual nodes is tailored in accordance with specific cost and/or performance requirements. Software "agnostic" implementations of the CDN described herein advantageously enable optimization of software modules (e.g., web server) for the traffic being served. By way of example, an Apache server may be selected to handle linear content, and an NGiNX server may be selected for providing VOD content.

In some implementations, a given hardware node configuration configured, e.g., to support linear content delivery, is augmented to support VOD by use of additional storage (e.g., hard disks). The additional storage may be embodied within the node serve, and/or as an attached array (e.g., via a serial bus and/or as network attached storage).

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. The foregoing description is of the best mode presently contemplated of carrying out the techniques and architectures disclosed herein. This description is in no way meant to be limiting, but rather should be taken as illustrative of the general principles of the disclosure. The scope of the disclosure should be determined with reference to the claims.

What is claimed is:

1. A computerized method of operating a content delivery network (CDN) so as to enable computer algorithm-based mapping of individual network resources to address space for delivery of digitally rendered content associated with the individual network resources, the computerized method comprising:

utilizing a resource route (RR) mapping process to determine at least one routing path to access a plurality of the individual network resources, a portion of the plurality of individual network resources disposed in another CDN, the RR mapping process comprising:
issuance of a mapping request to a first network entity configured to provide mapping data in a prescribed format; and
generation of a plurality of mapping data that is associated with the plurality of individual network resources, the plurality of individual network resources comprising at least (i) a first network resource associated with the CDN and (ii) a second network resource associated with the another CDN, the generated plurality of mapping data enabling a second network entity to return response data via each of the plurality of individual network resources; and advertising, via at least the another CDN and based at least on the determined at least one routing path, the plurality of individual network resources within the CDN.

2. The computerized method of claim 1, further comprising causing delivery of data relating to the plurality of individual network resources to a computerized client process, the computerized client process comprising a JIT (just-in-time) packager apparatus.

3. The computerized method of claim 1, wherein the prescribed format is associated with an Internet addressing protocol having a prescribed address space or minimum length, the Internet addressing protocol comprises Internet Protocol version 6 (IPv6), and the utilizing the RR mapping process comprises utilizing the Internet addressing protocol.

4. The computerized method of claim 1, wherein:
each of the plurality of individual network resources comprises a content element associated with a respective universal resource locator (URL); and the utilizing the RR mapping process comprises utilizing an RR mapping process configured to assign an Internet Protocol (IP) address to the respective URL associated with a respective one of the plurality of individual network resources.

5. The computerized method of claim 1, wherein the utilizing the RR mapping process comprises utilizing a resource routing data structure comprising a number of routes; and wherein the computerized method further comprises utilizing at least one route aggregation algorithm to limit the number of routes such that one or more peer CDNs require only route aggregation data to access a given one of the plurality of individual network resources.

6. The computerized method of claim 1, further comprising utilizing at least one address de-aggregation algorithm to enable resource-node affinity within the CDN.

7. Computer readable apparatus comprising a non-transitory storage medium, the non-transitory medium comprising at least one computer program having a plurality of instructions, the plurality of instructions configured to, when executed on a processing apparatus in data communication with the computer readable apparatus:

provide resource mapping via a first content delivery network (CDN) for a plurality of network resource elements disposed within a second CDN, the provision of resource mapping comprising:

receipt of data indicative of a user device request for access to a particular one of the plurality of network resource elements, the user device request comprising data descriptive of the particular one of the plurality of network resource elements;

determination, based at least on the data indicative of the user device request, that the particular one of the plurality of network resource elements is disposed within the second CDN, the particular one of the plurality of network resource elements having a network address associated therewith, the network address being specific to the second CDN;

cause evaluation of the data descriptive of the particular one of the plurality of network resource elements to determine the network address; and cause utilization of the determined network address by the user device to access the requested particular one of the plurality of network resource elements.

8. The computer readable apparatus of claim 7, wherein the first CDN comprises a multi-tiered configuration configured to deliver data relating to one or more of the plurality of network resource elements to a plurality of user devices via a plurality of routes based on resource-specific advertisements.

9. The computer readable apparatus of claim 7, wherein the utilization of the determined network address comprises use of one or more DNS (domain name system) or HTTP (Hypertext Transfer Protocol) redirect operations via a redirect server apparatus to allow the first CDN to obtain data relating to the one network resource element from the second CDN.

10. The computer readable apparatus of claim 7, wherein the plurality of network resource elements within the second CDN are advertised according to a border gateway protocol (BGP).

11. The computer readable apparatus of claim 7, wherein the resource mapping associates each of the plurality of network resource elements with an Internet Protocol (IP) address to allow for direct resource-specific advertisement of the plurality of network resource elements at a packager process layer.

12. Computerized node apparatus for use in a content delivery network (CDN), the computerized node apparatus comprising:

network interface apparatus configured to support data communication with one or more computerized network entities;

route manager apparatus configured to cause at least one of advertisement or withdrawal of delivery routes based on one or more metrics;

digital processor apparatus in data communication with at least the network interface apparatus; and storage apparatus in data communication with the digital processor apparatus and comprising at least one computer program, the at least one computer program configured to, when executed by the digital processor apparatus, cause the computerized node apparatus to at least:

receive, from a computerized client device, data representative of a request for a resource;

transmit, to a computerized mapping process, data representative of a mapping request for an Internet Protocol (IP) address, the computerized mapping process configured to assign the IP address to a uniform resource locator (URL) that is: (i) registered with the computerized mapping process, (ii) associated with the requested resource, and (iii) configured to enable mapping between at least (a) the requested resource and (b) the IP address assigned to the URL;

based at least on the IP address, perform a route lookup to determine at least one routing path to access a computerized route server apparatus by the computerized client device, the routing path comprising a data communication path between an edge node configured for data communication with the computerized client device and an edge node configured for data communication with the computerized route server apparatus; and transmit, to the computerized route server apparatus, data representative of a request for the computerized route server apparatus to backfill the resource so as to provide access to the resource by the computerized client device.

13. The computerized node apparatus of claim 12, wherein the at least one computer program is further configured to, when executed by the digital processor apparatus:

change or rewrite at least a portion of a path of the mapping request, the change or rewrite enabling one or more network nodes to perform a route lookup on the mapping request provided in the changed or rewritten path.

14. The computerized node apparatus of claim 12, wherein the at least one computer program is further configured to, when executed by the digital processor apparatus:

utilize a map caching mechanism to prevent one or more caches from needing to consult the computerized mapping process for every request for the IP address.

15. The computerized node apparatus of claim 12, wherein the computerized mapping process comprises a computerized network device (i) maintained by a managed network operator (MSO) of the CDN, and (ii) configured to resolve Internet Protocol version 6 (IPv6) addresses for individual resources within the CDN.

16. The computerized node apparatus of claim 12, wherein the computerized mapping process enables at least one of (i) one or more edge nodes within the CDN or (ii) one or more computerized client devices, to request the resource from an origin server apparatus.

17. The computerized node apparatus of claim 16, wherein the origin server apparatus resides on a different CDN than the CDN.

18. The computerized node apparatus of claim 17, wherein the different CDN comprises a third party network, and the CDN comprises a managed content delivery network.

19. The computerized node apparatus of claim 16, wherein:
   the CDN comprises a multi-tiered configuration configured to provide access to one or more resources to a plurality of computerized client devices via a plurality of routes based on resource-specific advertisements; and
   the at least one computer program is further configured to, when executed by the digital processor apparatus:
   select, based at least on popularity of the one or more resources, to (i) serve one or more respective requests from one or more of the plurality of computerized client devices for the one or more resources, or (ii) allow a tier of the CDN that is higher than a tier with which the computerized node apparatus is associated, to serve the one or more requests.

20. The computerized node apparatus of claim 19, wherein the computerized node apparatus comprises an edge cache node, and the selection of (i) serving the one or more respective requests or (ii) allowing the higher tier of the CDN to serve the one or more requests based at least on the popularity of the one or more resources is configured to mitigate at least one resource of a lower popularity than a number of other resources from utilizing resources of the edge cache node.

\* \* \* \* \*